(12) United States Patent
Iijima

(10) Patent No.: US 6,286,071 B1
(45) Date of Patent: Sep. 4, 2001

(54) COMMUNICATION CONTROL METHOD, COMMUNICATION SYSTEM AND ELECTRONIC DEVICE USED THEREFOR

(75) Inventor: Yuko Iijima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/520,907

(22) Filed: Mar. 7, 2000

Related U.S. Application Data

(63) Continuation of application No. PCT/JP99/03694, filed on Jul. 8, 1999.

(30) Foreign Application Priority Data

Jul. 9, 1998  (JP) .................................................. 10-194564

(51) Int. Cl.[7] ............................. H04L 12/28; G06F 13/00
(52) U.S. Cl. ................................. 710/124; 710/5; 710/15; 710/20; 710/24; 710/25; 710/29; 710/36; 713/300
(58) Field of Search ................................... 710/5, 15, 20, 710/24, 25, 29, 36, 124; 713/300

(56) References Cited

U.S. PATENT DOCUMENTS

| | | | |
|---|---|---|---|
| 5,787,259 | * | 7/1998 | Haroun et al. ................... 395/200.83 |
| 5,919,261 | * | 7/1999 | Aoki et al. ............................ 713/300 |
| 6,038,625 | * | 3/2000 | Ogino et al. .......................... 710/104 |
| 6,052,750 | * | 4/2000 | Lea ......................................... 710/72 |
| 6,061,746 | * | 5/2000 | Stanley et al. ......................... 710/10 |
| 6,085,236 | * | 7/2000 | Lee ....................................... 709/220 |
| 6,151,651 | * | 11/2000 | Hewitt et al. ........................ 710/129 |
| 6,160,796 | * | 12/2000 | Zou ...................................... 370/257 |
| 6,199,136 | * | 3/2001 | Shteyn ................................. 710/129 |

FOREIGN PATENT DOCUMENTS

| | | |
|---|---|---|
| 7-312606 | 11/1995 | (JP) . |
| 10-283309 | 10/1998 | (JP) . |
| 411205363A | * 7/1999 | (JP) . |
| 411331218A | * 11/1999 | (JP) . |
| 02000151738 | * 5/2000 | (JP) . |

OTHER PUBLICATIONS

Jhon Scheible, "Jikkou data tensou sokudo to tai koshousei no koujou o hakaru", Nikkei Electronics, No. 612, pp. 143–151, Jul. 4, 1994.

* cited by examiner

*Primary Examiner*—Viet Q. Nguyen
(74) *Attorney, Agent, or Firm*—Frommer Lawrence & Haug LLP; William S. Frommer

(57) ABSTRACT

A communication system includes a communication control section which may receive bus use requests of both of a DV camera/recorder (50) which becomes an output machine on a serial bus (60D) and a DV deck (40) which becomes an input machine on the serial bus (60D), may check whether or not the serial bus (60D) which were requested to be used is in use, may open the serial bus (60D) to the DV camera/recorder (50) and the DV deck (40) which issued the use requests, may protect a connection between the DV camera/recorder (50) and the DV deck (40), may open a serial bus (60A) to an IRD receiver (10) and a mini disc (20) which issued use requests and which may protect a connection between the IRD receiver (10) and the mini disc (20). According to this arrangement, even when data used on a communication control bus have different signal formats, a communication control bus of other specific interval in which the use requests are not overlapped can be used simultaneously by other electronic devices, and such communication control bus can be used effectively.

12 Claims, 11 Drawing Sheets

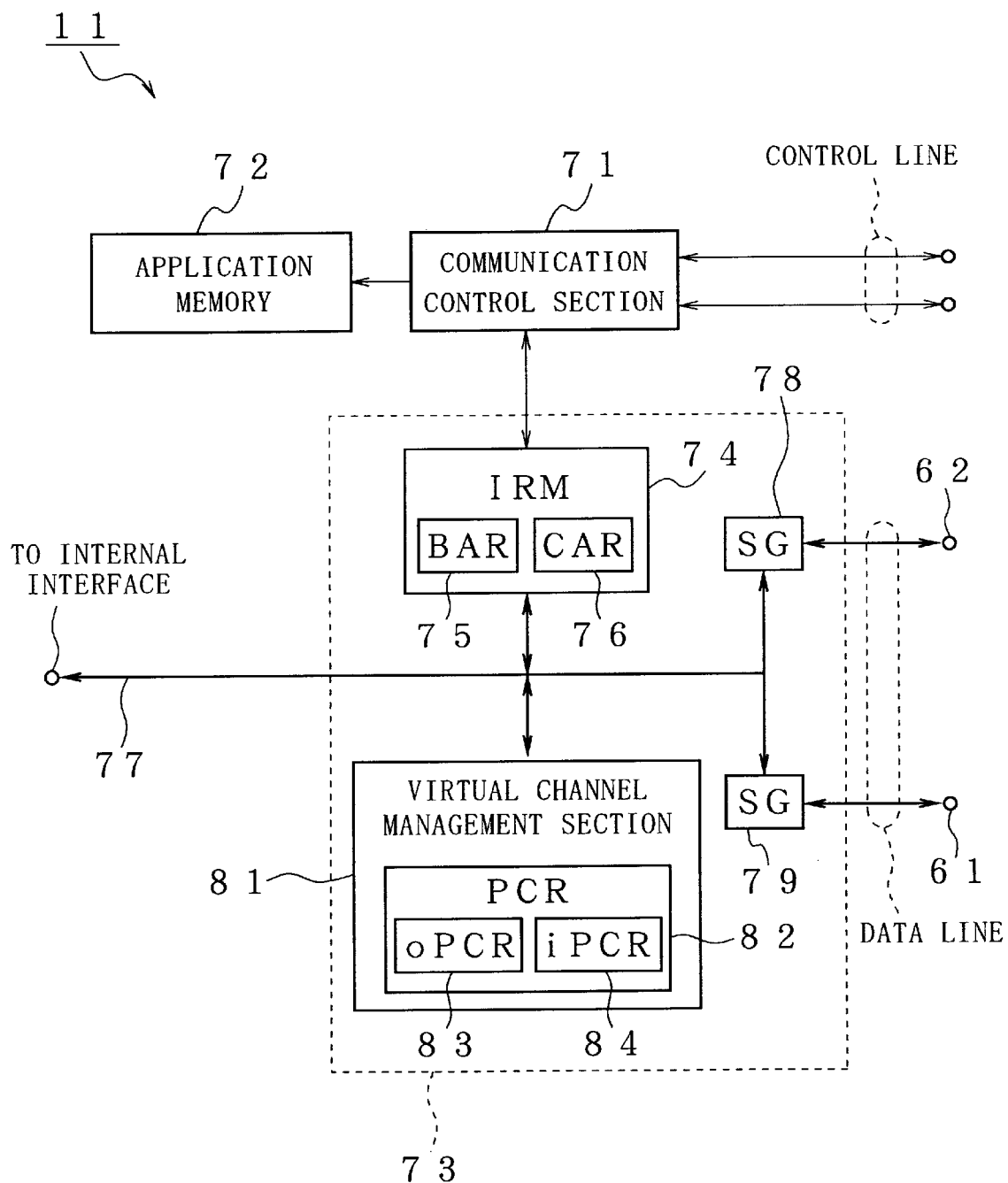
F I G. 7

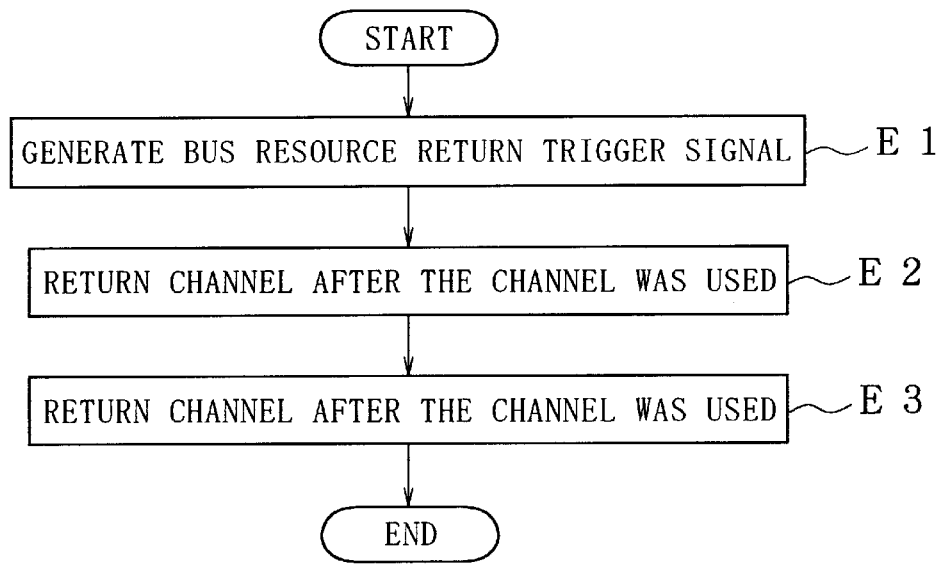
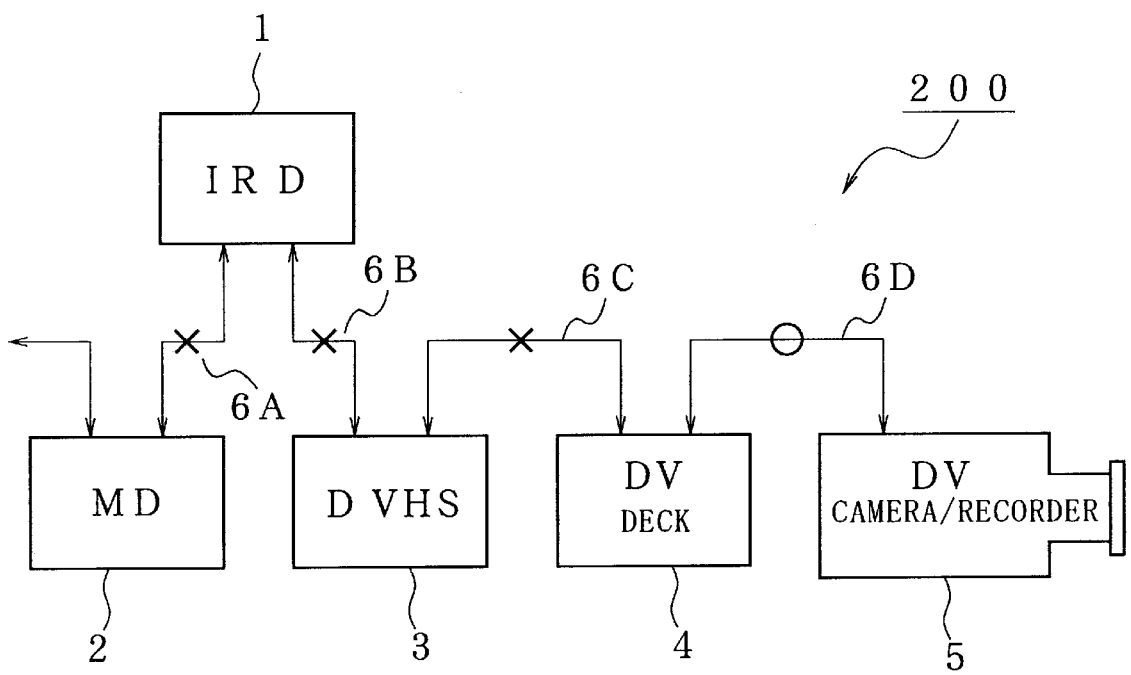

COMMUNICATION CONTROL METHOD, COMMUNICATION SYSTEM AND ELECTRONIC DEVICE USED THEREFOR

This is a continuation of copending International Application PCT/JP99/03694 having an international filing date of Jul. 8, 1999.

TECHNICAL FIELD

This invention relates to a communication control method, a communication system and an electronic device used therefor for use with electric household appliances, a personal computer (hereinafter referred to as a personal computer), peripheral equipment of such personal computer and an external memory housed within the personal computer connected to a communication control bus such as an IEEE 1394 standard serial bus.

More particularly, it may be checked whether or not a communication is effected on the specific interval of the communication control bus which was requested to be used. If the communication may not be effected on the communication control bus of such specific interval, the communication control bus of such specific interval may be opened to a set of electronic devices which had issued requests, and a connection between these electronic devices may be protected. Thus, even when signal formats of data used on that communication control bus are different from each other, the communication control bus of other specific interval in which the use requests are not overlapping can be simultaneously used by other electronic devices and such communication control bus can be utilized effectively.

BACKGROUND ART

Recently, digital video cameras having a function to transmit and receive a digital video signal and a digital audio signal by use of IEEE 1394 high-speed serial bus (hereinafter simply referred to as 1394 serial bus) have already been commercially available on the market. Also, the 1394 serial bus receives a remarkable attention as an interface for connecting peripheral equipment to a personal computer.

This 1394 serial bus may prepare an isochronous transfer mode for assuring that packets of a predetermined amount may be transmitted and received at every 125 μs and an asynchronous transfer mode suitable for transferring control commands and files although the asynchronous mode is inferior to the isochronous transfer mode in priority. For example, when digital electric household appliances such as digital video camera and a digital video deck may be connected by the 1394 serial bus, there can be transferred at a high speed real time data such as a digital video signal and a digital audio signal.

A communication system 200 connected to the electric household appliances by this kind of 1394 serial bus will be described with reference to FIG. 13. The communication system 200 shown in FIG. 13 may include a digital satellite receiver (Integrated Receiver Decoder: hereinafter referred to as an IRD receiver) 1 to receive digital satellite broadcasting such as a movie and a piece of music. A mini disc 2 may be connected to this IRD receiver 1 by the 1394 serial bus 6A to record/reproduce digital data such as a piece of music received from the satellite.

Also, digital home video apparatus (hereinafter referred to as D-VHS apparatus) 3 may be connected to the IRD receiver 1 by a 1394 serial bus 6B in a daisy-chain fashion (daisy chain fashion) to record/reproduce digital data such as a piece of music received from the satellite. A digital video deck (hereinafter referred to as a DV deck) 4 may be connected to the D-VHS apparatus 3 by a 1394 serial bus 6C in a daisy-chain fashion to record/reproduce digital data such as recording video data. A video recorder having a built-in type camera (hereinafter referred to as a DV camera/recorder) 5 may be connected to the DV deck 4 by a 1394 serial bus 6D in a daisy-chain fashion to record/reproduce digital data such as recording video data.

MPEG transport stream data (hereinafter referred to as MPEG data) based on the moving picture compression system may be transferred among the IRD apparatus 1, the mini disc 2 and the D-VHS apparatus 3, and digital video data (hereinafter referred to as DV data) may be transferred between the DV deck 4 and the DV camera/recorder 5. For example, in the communication system 200 shown in FIG. 13, the digital video signal and the digital audio signal recorded by the DV camera/recorder 5 may be played back and these DV data may be recorded by the DV deck 4.

According to the conventional communication system 200, when digital household equipment for handling MPEG data and DV data having different signal formats may be connected to the 1394 serial buses 6A to 6D, the DV camera/recorder 5 which had been served as a digital video signal output machine, for example, to issue a bus use request and which had acquired the bus use right may output a digital video signal to a default channel No. (e.g. channel 63) on a previously-prescribed bus management.

Then, the DV deck 4 which, may be used as the digital video signal input machine may input a digital video signal from the same default channel No. Thus, the digital video signal can be easily transmitted and received between the DV camera/recorder 5 and the DV deck 4 which had acquired the bus use right with the priority to the IRD receiver 1 used as the output machine.

However, according to the conventional communication system 200, if the DV camera/recorder 5 and the DV deck 4 shown in FIG. 13 may use the 1394 serial bus 6D which is the specific interval in which they had previously acquired the bus use right with the priority to digital household equipment which can become other output machines, the IRD receiver 1 and the mini disc 2 cannot use the 1394 serial bus 6A and the IRD receiver 1 and the D-VHS apparatus 3 cannot use the 1394 serial bus 6B.

The reason for this may be considered such that DV data may enter the 1394 serial buses 6A to 6C for which the DV camera/recorder 5 and the DV deck 4 have not issued the bus use requests so that the IRD apparatus 1, the mini disc 2 and the D-VHS apparatus 3 which may handle MPEG data cannot receive the DV data.

Therefore, although the 1394 serial buses (hereinafter referred to as communication control buses) 6A and 6B have sufficient available channels and bandwidths (bus resources) to handle MPEG data, such available channels and bandwidths cannot be used between the IRD receiver 1 and the mini disc 2 and the IRD receiver 1 and the D-VHS apparatus (hereinafter referred to as electronic device) 3. In this connection, it may become difficult to record a piece of music or the like digitally received at the IRD receiver 1 from the satellite on the mini disc 2 or to record a movie received at the IRD receiver 1 on the D-VHS apparatus 3 at the same time DV data may be recorded on the DV deck 4 from the DV camera/recorder 5.

As a result, there arises a problem that applications that can input and output signals on the communication system 200 may be limited, thereby making it impossible to utilize the bus resource effectively.

Therefore, in view of the above-described aspect, the present invention is created and, an object of the present invention is to provide a communication control method, a communication system and electronic devices used therefor in which even when signal formats of data used on the communication control bus are different from each other, communication control buses of other specific intervals in which use requests are not overlapped can be simultaneously used by other electronic devices and the communication control bus can be utilized effectively.

DISCLOSURE OF THE INVENTION

In a communication control method according to this invention, a method of controlling a communication between a plurality of electronic devices connected by a communication control bus in a daisy-chain fashion comprises the steps of receiving bus use requests from both of an electronic device serving as an output machine on the communication control bus and an input machine serving as an input machine on the communication control bus, checking whether or not a specific interval of the communication control bus which was requested to be used is used and opening the communication control bus of the specific interval to an electronic device of signal input/output pair which were requested in use and protecting a connection between the electronic devices if the communication control bus of the specific interval from which the bus use request was issued is not in use.

According to the communication control method of the present invention, when the requests to use bus are received from both of an electronic device which becomes an output machine on a communication control bus and an electronic device which becomes an input machine on the communication control bus, it is checked whether or not the specific interval of the communication control bus which was requested to be used is in use, and the communication control bus of the specific interval is made free to electronic devices of signal input and output pair which had issued the bus use requests and a connection between these electronic devices is protected if the communication control bus of the specific interval is not in use.

For example, if the communication control bus of the specific interval which was requested to be used is in use, then the bus use requests from both of an electronic device which becomes an output machine on the remaining communication control bus and an electronic device which becomes an input device on the remaining communication control bus are received. It is checked whether or not other specific interval of the communication control bus which was requested to be used is in use. If the communication control bus of this specific interval is not in use, then the communication control bus of this specific interval is made free to electronic devices of other signal input and output pair which had issued the use requests, and a connection between these electronic devices is protected.

Accordingly, even when signal formats of data used on the communication control bus are different from each other, the communication control bus of other specific interval in which the use requests are not overlapped can be made free to electronic devices of other signal input and output pair, and a connection between electronic devices of other signal input and output pair can be protected. Thus, since the communication control buses divided by the specific intervals can be used simultaneously, so long as a bus resource is unoccupied, multichannel signals and a variety of signals can be inputted and outputted.

In a communication system in which a plurality of electronic devices are connected in a daisy-chain fashion by a communication control bus, a communication system according to this invention includes a bus management control means wherein the bus use requests from both of an electronic device which becomes an output machine on the communication control bus and an electronic device which becomes an input machine on the communication control bus are received. Then, it is checked whether or not the specific interval of the communication control bus which was requested to be used is in use. If the communication control bus of the specific interval which was requested to be used is not in use, then the communication control bus of the specific interval is made free to the electronic devices of the signal input and output pair which had issued the requests to use bus and a connection between the electronic devices is protected.

According to the communication system of this invention, when the bus use requests are outputted to the control means from both of the electronic device which becomes the output machine on the communication control bus and the electronic device which becomes the input machine on the communication control bus, it is checked by the control means whether or not the specific interval of the communication control bus from which the bus use request was issued is in use. If the communication control bus of the specific interval is not in use, then the communication control bus of such specific interval is made free to the electronic devices of the signal input and output pair, and also the connection between these electronic device may be protected.

For example, by the control means to which a plurality of default channels from a bus management standpoint may be inputted, the electronic device which becomes the output machine may be controlled in such a manner that such electronic device may output data to the default channel. If such default channel is protected, then the electronic device may be controlled so as to output data to an unoccupied default channel.

Also, the electronic device which becomes the input machine may be controlled in such a manner that such electronic device may input data from the default channel. If such default channel is protected, then the electronic device may be controlled so as to input data from an unoccupied default channel.

Accordingly, even when signal formats of data used on the communication control bus are different from each other, the communication control bus of other specific interval in which the bus use requests are not overlapped can be made free to other electronic devices, and also the connection between these other electronic devices can be protected. Thus, since the communication control bus divided by the specific interval can be used simultaneously, so long as the bus resource is unoccupied, multichannel signals and a variety of signals can be inputted and outputted.

In an electronic device connected in a daisy-chain fashion by a communication control bus, an electronic device according to this invention includes an operation means which generates a bus use request signal based on a data output start operation when the electronic device is used as an output machine on the communication control bus and which generates a bus use request signal based on a data input start operation when the electronic device is used as an input machine on the communication control bus.

According to the electronic device of this invention, when the electronic device is used as the output machine on the communication control bus, the operation means generates the bus use request signal based on the data output start operation of the user. Also, when the electronic device is used as the input machine on the communication control bus, the operation means generates the bus use request signal based on the data input start operation of the user.

For example, when the electronic device becomes the output machine on the communication control bus, the operation means outputs data to the default channel on the communication channel based on the bus use request signal. Also, when the electronic device becomes the input device on the communication control bus, the operation means searches data flowing from the default channel on the communication control bus based on the bus use request signal, decodes inputted data obtained by this data search, and may process a variety of information based on this decoded output.

Accordingly, the electronic device used as the input machine may search data that can be inputted on the communication control bus based on the bus use request signal, and the electronic device used as the output machine may output data to the unoccupied channel on the communication control bus based on the bus use request signal.

Thus, the user can switch the input with ease and can easily obtain desired data without selecting other electronic devices or with no knowledge on the concept such as the IEEE 1394 serial bus. Accordingly, it is possible to alleviate a burden imposed upon the user when the user operates a plurality of electronic devices connected by the communication control bus.

BRIEF DESCRIPTION OF DRAWINGS

FIG. 7 is a block diagram showing an example of an arrangement of a bus interface 11 according to the IEEE 1394 standard.

FIG. 12 is a flowchart to which reference will be made in explaining the operations executed when the bus resources of the electronic devices connected to the serial buses 60A to 60D are returned.

FIG. 13 is a block diagram showing an example of an arrangement of a communication system 200 according to the prior art.

BEST MODE FOR CARRYING OUT THE INVENTION

Figure 1:
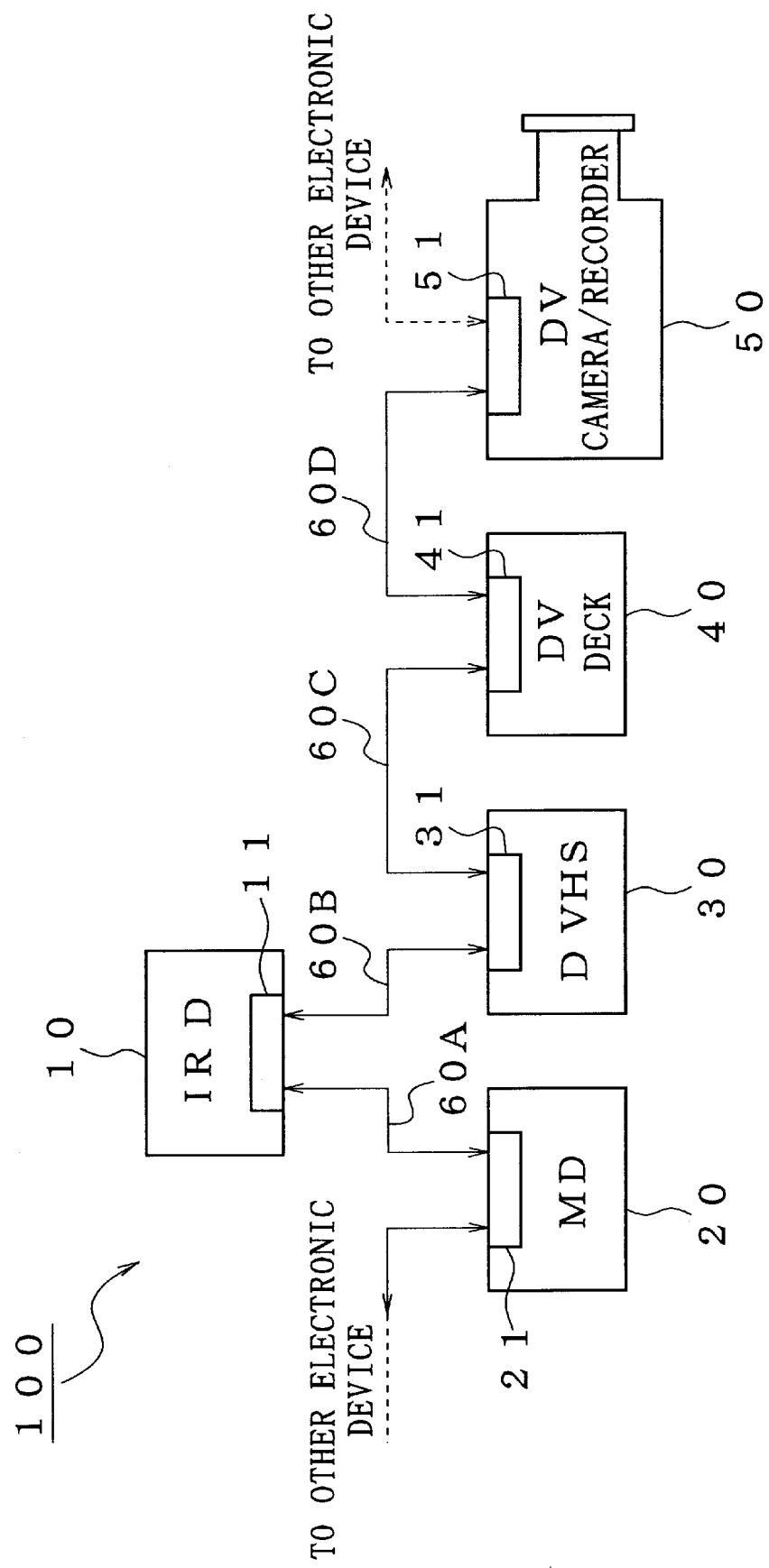
FIG. 1 is a block diagram showing an example of an arrangement of a communication system 100 according to an embodiment of the present invention.

In this embodiment, it may be checked whether or not a communication is effected in a specific interval of a communication control bus which is requested to be used. If a communication is not effected in the communication control bus of such specific interval, then the communication control bus of the specific interval may be made free to electronic devices of signal input/output pair which had requested to use the communication control bus, and connections of these electronic devices may be protected. Thus, even when signal formats of data used on the communication control bus are different from each other, communication control buses of other specific intervals in which the use requests are not overlapped can be simultaneously used by electronic devices of other signal input/output pair and such communication control bus can be used effectively.

In a communication system 100 shown in FIG. 1, an IEEE 1394 high-speed serial bus (hereinafter simply referred to as a serial bus) may be used as a communication control bus. A communication control method according to the present invention may be applied to a communication control method of controlling a plurality of electronic devices connected via this serial bus.

This communication system 10 may include a digital satellite receiver (Integrated Receiver Decoder: hereinafter referred to as an IRD receiver) 10 as an electronic device to receive a digital satellite broadcasting such as a movie or a piece of music. A mini disc 20 may be connected to this IRD receiver 10 by a serial bus 60A in a daisy-chain fashion (daisy-chain fashion) to record/reproduce a piece of music or the like received via satellite.

A digital home video apparatus (hereinafter referred to as a D-VHS apparatus) 30 may be connected to the IRD receiver 10 by a serial bus 60B in a daisy-chain fashion to record/reproduce a movie or the like received via satellite. A digital video deck (hereinafter referred to as a DV deck) 40 may be connected to the D-VHS apparatus 30 by a serial bus 60C in a daisy-chain fashion to record/reproduce a recorded image, or the like. A video recorder having a built-in type camera (hereinafter referred to as a DV camera/recorder) 50 may be connected to the DV deck 40 by a serial bus 60D in a daisy-chain fashion to record/reproduce a recorded image, or the like.

Figure 2:
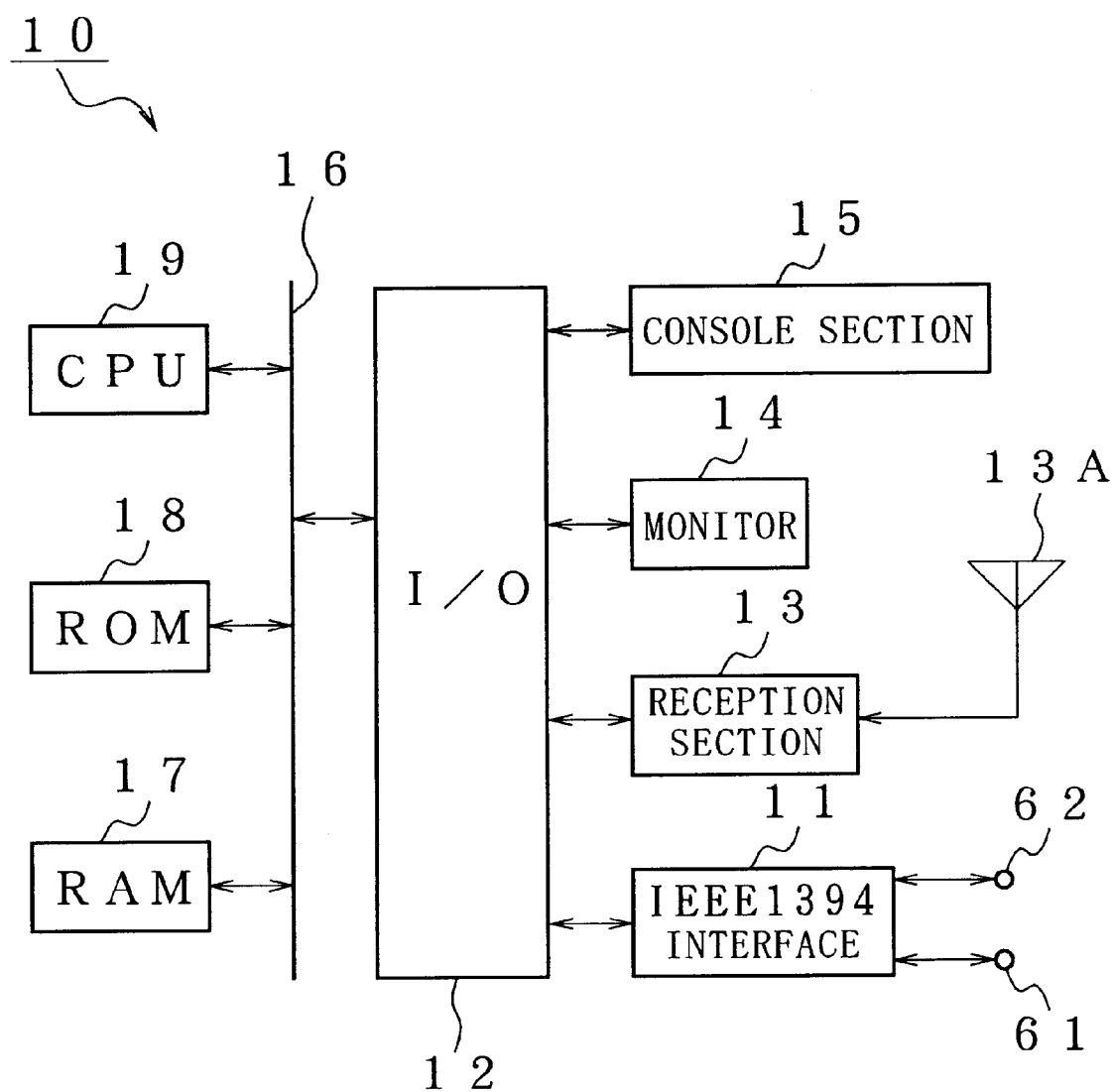
FIG. 2 is a block diagram showing an example of an arrangement of a digital satellite receiver 10.

In this example, the IRD receiver 10 may be provided with an IEEE serial bus control function interface section (hereinafter simply referred to as a standard interface) 11 shown in FIG. 2 as a bus management control means. Similarly, the mini disc 20 may be provided with a standard interface 21 shown in FIG. 3, the D-VHS apparatus 30 may be provided with a standard interface 31 shown in FIG. 4, the DV-deck 40 may be provided with a standard interface 41 shown in FIG. 5, and the DV camera/recorder 50 may be provided with a standard interface 51 shown in FIG. 6, respectively.

In this example, a communication control may be effected in such a manner that the standard interface 11, 21, 31, 41 or 51 which may start an action first can exercise the right to control the communication system. Alternatively, it is needless to say that a communication control may be effected such that a certain standard interface 11 may have a master function (right of master) and the remaining standard interfaces 21, 31, 41, 51 may have slave functions (rights of slaves). In this example, the former case will be described.

Accordingly, when the IRD receiver 10 and the DV camera/recorder 50 which are used at least as the output machines on the serial buses 60A to 60D and the mini disc 20, the D-VHS apparatus 30 and the DV deck 40 which are used as the input machines on the serial buses 60A to 60D may issue requests to use bus, such requests may be received by the standard interface 11 within the IRD receiver 10 which issued the request to use bus first, the standard interface 21 within the mini disc 20, the standard interface 31 within the D-VHS apparatus 30, the standard interface 41 within the DV deck 40 or the standard interface 51 within the DV camera/recorder 50. In each of the standard interfaces 11, 21, 31, 41, 51, it may be checked whether or not the four serial buses 60A, 60B, 60C and 60D which are the specific intervals of the communication control bus which was requested to be used had been used already.

In the communication system 100 shown in FIG. 1, let it be assumed that the digital video signal and the digital audio signal recorded by the DV camera/recorder 50 may be reproduced and that the serial bus 60D was already used in order for the DV deck 40 to record these DV data. Accordingly, the remaining serial buses 60A, 60B, 60C are not occupied.

In such a situation, when the IRD receiver 10 which becomes an output machine on the serial buses 60A, 60B and the mini disc 20 and the D-VHS apparatus 30 which become the input machines on the serial bus 60 may issue the requests to use bus, these requests to use bus may be received by the standard interface 11.

In this standard interface 11, it may be checked whether or not the serial buses 60A to 60C which were requested to be used were already used. If the serial buses 60A and 60B which were requested to be used are not used, then the serial bus 60A may be made free to the IRD receiver 10, the mini disc 20 and the D-VHS apparatus 30 which had issued the requests to use bus.

In this example, since the serial buses 60A, 60B and 60C are not in use, the bus may be made free to the IRD receiver 10 and the mini disc 20 which had issued the requests to use bus, and a connection between the IRD receiver 10 and the mini disc 20 may be protected. Also, the bus may be made free to the IRD receiver 10 and the D-VHS apparatus 30 which had issued the requests to use bus, and a connection between the IRD receiver 10 and the D-VHS apparatus 30 may be protected.

As the contents in which the connections may be protected in that very moment, an output plug of the IRD receiver 10, for example, and an input plug of the mini disc 20 may be connected together electrically and exclusively, and DV data from other serial bus 60D can be prevented from flowing thereto. To this end, the serial gates may be closed by the standard interfaces 21, 31, 41, 51 provided within the mini disc 20, the D-VHS apparatus 30, the DV deck 40 and the DV camera/recorder 50.

Accordingly, even when the signal formats of data used on the IEEE 1394 standard serial buses 60A to 60D may be different from each other, other serial buses 60A and 60B in which the use requests are not overlapped can be made free to the IRD receiver 10 and the D-VHS apparatus 30 and the IRD receiver 10 and the D-VHS apparatus 30. At the same time, the connections between the IRD receiver 10 and the D-VHS apparatus 30 and between the IRD receiver 10 and the D-VHS apparatus 30 can be protected. Thus, since the serial buses 60A, 60B which are obtained by separating the communication control bus with the specific interval can be used at the same time the serial bus 60D may be used, so long as the bus resources are not occupied, multichannel signals and a variety of signals can be inputted and outputted.

Subsequently, an example of an arrangement of the IRD receiver 10 will be described with reference to FIG. 2. This IRD receiver 10 may include an IEEE 1394 standard bus interface 11 shown in FIG. 2. The standard interface 11 may include two external input/output terminals 61, 62. One external input/output terminal 61 may be connected to the serial bus 60A and thereby connected to the mini disc 29. The other external input/output terminal 62 may be connected to the serial bus 60B and thereby connected to the D-VHS apparatus 30. An example of an arrangement of the inside of this standard interface 11 will be described with reference to FIG. 7.

An internal interface (I/O) 12 may be connected to the standard interface 11 to input/output MPEG data in which a digital video signal and a digital audio signal such as a movie or a piece of music were converted into predetermined signal formats. A digital satellite reception section 13 may be connected to the interface 12 to receive a digital satellite broadcasting such as a movie or a piece of music. A parabola antenna 13A or the like may be connected to the reception section 13.

A reception monitor 14 may be connected to this interface 12 as a display means to display character information such as titles of a movie and a piece of music obtained when the satellite broadcasting is received. As the monitor 14, there may be used a liquid-crystal display, a cathode-ray tube, or the like. In this example, when there are used the serial buses 60A and 60B which were requested to be used are in use, there may be executed an error processing for displaying (notifying) an message of "MPEG DATA CANNOT BE OUTPUTTED" on the monitor 14.

A console section (operation means) 15 may be connected to the internal interface 12 to thereby enable a user to select a movie or a music program when a satellite broadcasting is received. In this example, when the IRD receiver 10 may be used as the output machine on the serial buses 60A to 60D, the console section may generate a bus use request signal based on a data output start operation, and may generate a bus connection cancel signal based on a data output end operation. This interface may execute an IEEE 1394 standard interface processing by using these bus use request signal and bus connection cancel signal as trigger signals.

An internal bus 16 may be connected to the interface 12, and a RAM 17, a ROM 18 and a CPU (central processing unit) 19 may be connected to this internal bus 16. The RAM 17 may be used as a memory for a work area to temporarily store a variety of data transmitted and received between the standard interface 11, the internal interface 12, the reception unit 13, the monitor 14, the console section 15, the ROM 18 and the CPU 19. The ROM 18 may have stored therein a control program required when a digital satellite broadcasting is received.

The CPU 19 may control the input/output of the reception section 13, the monitor 14 and the console section 15 based on the control program read out from the ROM 18 when a satellite broadcasting is received. Also, the CPU 19 may control the input/output of the internal interface 12 in response to the standard interface 11 of the IRD receiver 10 when MPEG data such as a movie or a piece of music is transferred. For example, when the IRD receiver 10 may become the output machine on the serial buses 60A to 60D, MPEG data concerning the digital audio signal and the digital video signal may be outputted to default channels on the serial buses 60A to 60D.

Figure 3:
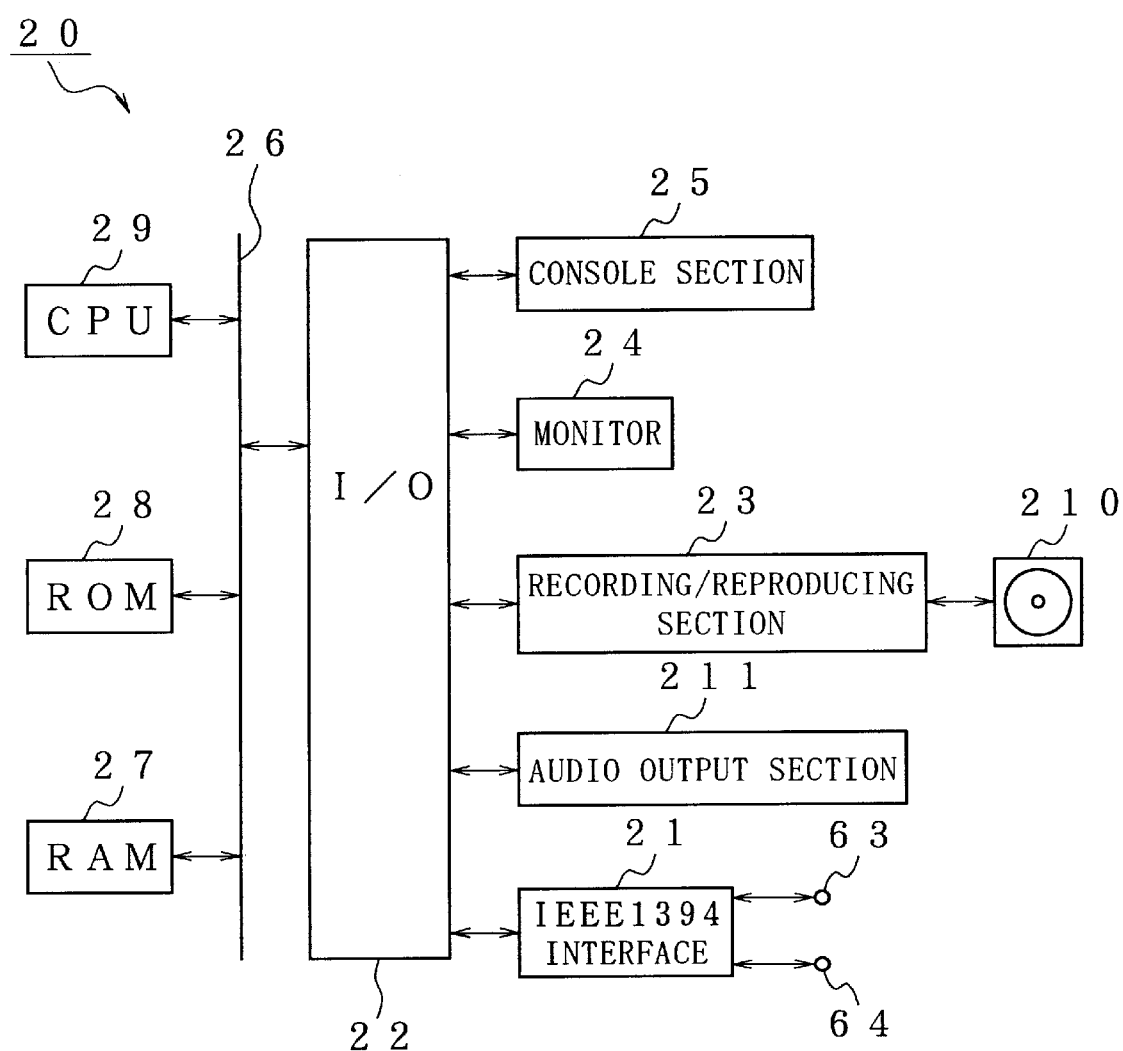
FIG. 3 is a block diagram showing an example of an arrangement of a mini disc 20.

Subsequently, an example of an arrangement of the mini disc 20 will be described with reference to FIG. 3. This mini disc 20 may include an IEEE 1394 standard bus/interface 21 shown in FIG. 3. This standard interface 21 may include two external input/output terminals 63, 64. One external input/output terminal 63 may be connected to the serial bus 60A and thereby connected to the IRD receiver 10. The other input/output terminal 64 may be connected to other digital household appliances. An arrangement of the inside of this standard interface 21 will be described with reference to FIG. 7.

An internal interface (I/O) 22 may be connected to this standard interface 21 to input and output MPEG data in which a digital audio signal such as a music was converted into a predetermined signal format. A recording/reproducing section 23 may be connected to the interface 22 to record music information on a magnetooptical disk 210, or the like or to reproduce music information from the magnetooptical disk 210.

A monitor 24 such as a liquid-crystal display may be connected to this internal interface 22 as a display means to display character information such as music titles required when music information is recorded/reproduced. In this example, when the serial bus 60A which was requested to be used is already in use, there may be executed an error processing which may display (notify) a message of "MPEG DATA CANNOT BE INPUTTED" on the monitor 24.

Further, a console section (operation means) 25 may be connected to the internal interface 22 to enable a user to input a title and a name of composer when music information is recorded/reproduced. In this example, when the mini disc 20 is used as the input machine on the serial buses 60A to 60D, the internal interface may generate a bus use request signal based on a data input start operation, and may generate a bus connection cancel signal based on a data input end operation. The internal interface may execute the IEEE 1394 standard interface processing by using these bus use request signal and bus connection cancel signal as trigger signals. An audio output section 211 may further be connected to the internal interface 22 to output music information reproduced by the recording/reproducing section 23.

Also, an internal bus 26 may be connected to the internal interface 22, and a RAM 27, a ROM 28 and a CPU 29 may be connected to this internal bus 26. The RAM 27 may be used to temporarily store a variety of data transmitted and received between the standard interface 21, the internal interface 22, the recording/reproducing section 23, the monitor 24, the console section 25, the ROM 28, the CPU 29 and the audio output section 211. The ROM 28 may have stored therein a control program required to record/reproduce music information. The CPU 29 may control the input and output of the recording/reproducing section 23, the monitor 24, the console section 25 and the audio output section 211 based on the control program read out from the ROM 28.

In this example, the CPU 29 may issue a bus use request to the standard interface 21 when MPEG data such as music information is transferred, and may control the input and output of the internal interface 21 in response to the standard interface 21. For example, when the mini disc 20 may become the input machine on the serial buses 60A to 60D, MPEG data (digital audio signal) flowing from the default channels on the serial buses 60A to 60D may be searched, MPEG data obtained when data is searched may be decoded, and a variety of information may be processed based on the decoded output.

Figure 4:
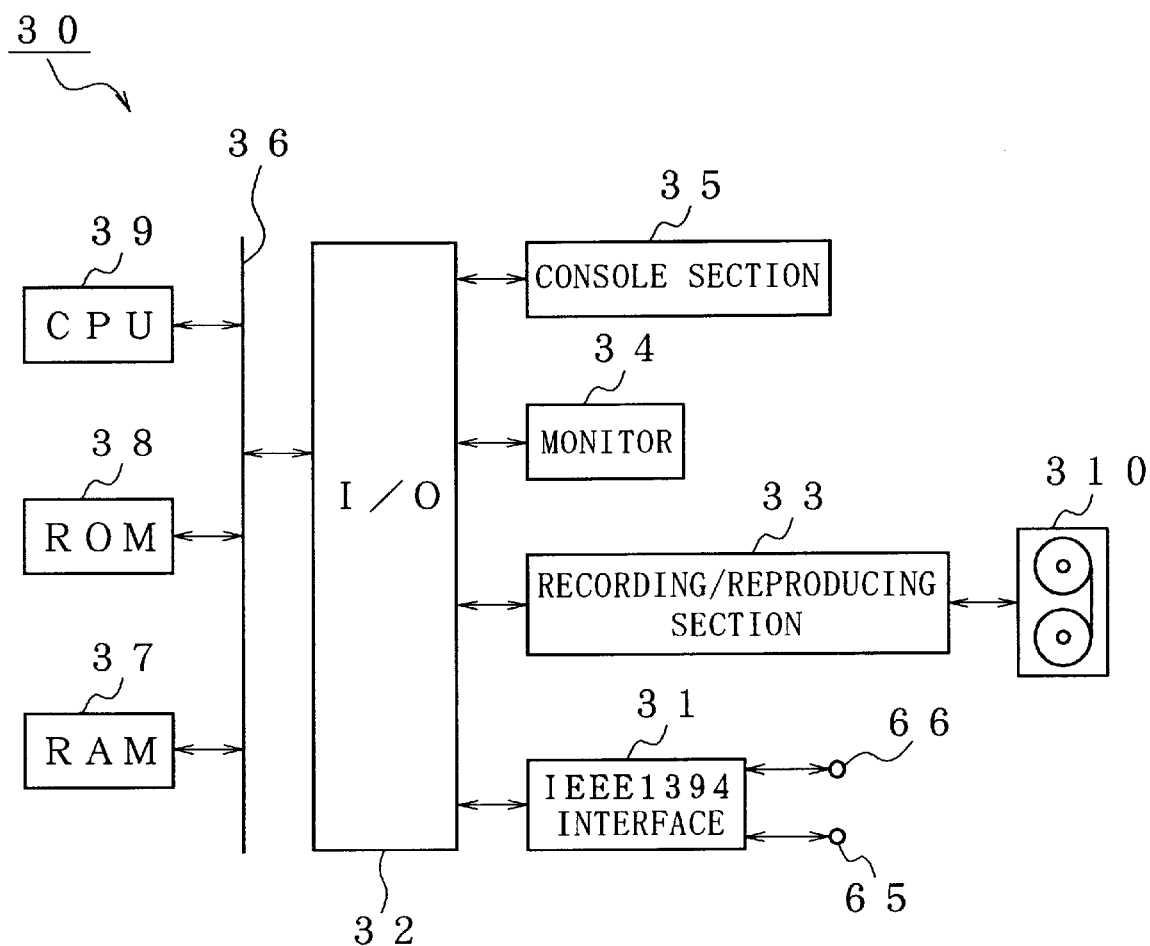
FIG. 4 is a block diagram showing an example of an arrangement of a digital home video apparatus 30.

Subsequently, an example of an arrangement of the D-VHS apparatus 30 will be described with reference to FIG. 4. This D-VHS apparatus 30 may include an IEEE 1394 standard bus/interface 31 shown in FIG. 4. The standard interface 31 may include two external input/output terminals 65, 66. One external input/output terminal 65 may be connected to the serial bus 60B and thereby connected to the IRD receiver 10. The other input/output terminal 66 may be connected to the serial bus 60C and thereby connected to the DV-deck 40. An example of an arrangement of the inside of this standard interface 31 will be described with reference to FIG. 7 together with the standard interface 11.

An internal interface (I/O) 32 may be connected to this standard interface 31 to input and output MPEG data in which a digital video signal such as a movie was converted into a predetermined signal format. A recording/reproducing section 33 may be connected to the interface 32 to record movie information received via satellite on a digital video cassette 310 or to reproduce movie information from the digital video cassette 310.

A monitor 34 such as a liquid-crystal display may be connected to this internal interface 32 as a display means to display character information such as a title of a movie obtained upon recording/reproducing. In this example, when the serial bus 60B that was requested to be used is in use, there may be executed an error processing in which a message of "MPEG DATA CANNOT BE INPUTTED" may be displayed (notified) on the monitor 34.

A console section (operation means) 35 may further be connected to this internal interface 32 by which a user may input a title, a name of creator or the like upon recording/reproducing. In this example, when the D-VHS apparatus 30 is used as the input machine on the serial buses 60A to 60D, the internal interface may generate a bus use request signal based on a data input start operation and may generate a bus connection cancel signal based on a data input end operation. The internal interface may execute an IEEE 1394 standard interface processing by using these bus request signal and bus connection cancel signal as trigger signals.

An internal bus 36 may be connected to the internal bus 32, and a RAM 37, a ROM 38 and a CPU 39 may be connected to this internal bus 36. The RAM 37 may be used to temporarily store a variety of data transmitted and received between the standard interface 31, the internal interface 32, the recording/reproducing section 33, the monitor 34, the console section 35, the ROM 38 and the CPU 39. The ROM 38 may have stored therein control programs required to record/reproduce movie information. The CPU 39 may control the input and output of the recording/reproducing section 33, the monitor 34 and the console section 35 based on the control programs read out from the ROM 38 upon recording/reproducing.

In this example, when MPEG data such as movie information may be transferred, the CPU 39 may issue a bus use request to the standard interface 31 and may control the input and output of the internal interface 32 in response to the standard interface 31. For example, when the D-VHS apparatus 30 may become the input machine on the serial buses 60A to 60D, MPEG data (digital video signal) which flows from the default channels on the serial buses 60A to 60D may be searched. The MPEG data thus obtained by data search may be decoded, and a variety of information may be processed based on a decoded output.

Figure 5:
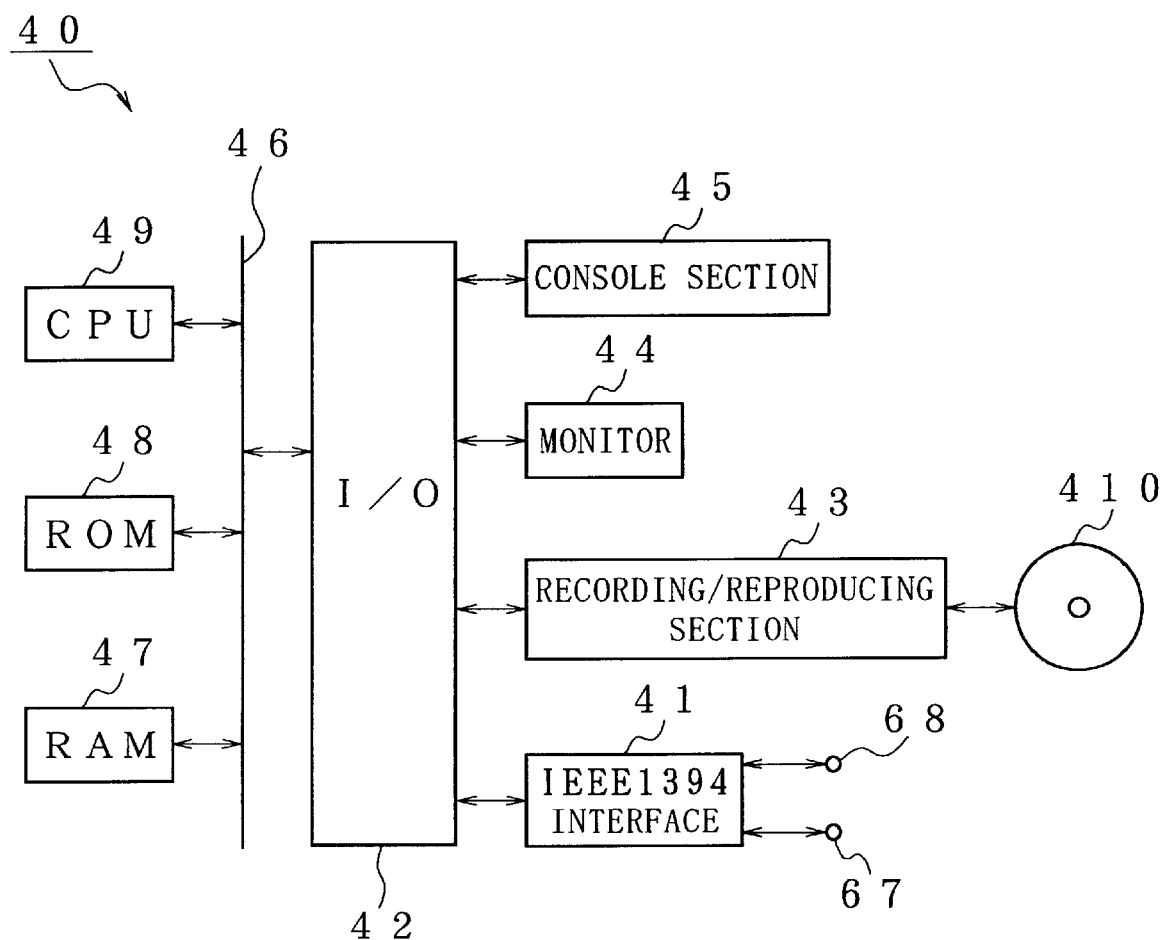
FIG. 5 is a block diagram showing an example of an arrangement of a digital video deck 40.

Subsequently, an example of an arrangement of the DV deck 40 will be described with reference to FIG. 5. The DV deck 40 may include an IEEE 1394 standard bus/interface 41 shown in FIG. 5. The standard interface 41 may include two external input/output terminals 67, 68. One external input/output terminal 67 may be connected to the serial bus 60C and thereby connected to the D-VHS apparatus 30. The other input/output terminal 68 may be connected to the serial bus 60D and thereby connected to the DV camera/recorder 50. An example of an arrangement of the inside of this standard interface 41 will be described with reference to FIG. 7 together with the standard interface 11.

An internal interface (I/O) 42 may be connected to this standard interface 41 to input and output a digital video signal (hereinafter referred to as DV data) in which recorded image was picked up. A recording/reproducing section 43 may be connected to the internal interface 42 to record a recorded image picked up real time on a digital video disk 410 or the like or to reproduce the recorded image from the digital video disk 410.

A monitor 44 such as a liquid-crystal display may be connected to this internal interface 42 to display a title and year and date of a recorded image required upon recording/reproducing. In this example, when the serial bus 60C that was requested to be used may be in use, there may be executed an error processing which may display (notify) a message of "DV DATA CANNOT BE INPUTTED" on the monitor 44.

A console section (operation means) 45 may further be connected to the interface 42 by which a user may input a title, year and date of the picked-up image upon recording/reproducing. In this example, when the DV deck 40 may be used as the input machine on the serial buses 60A to 60D, the console section may issue a bus use request signal based on a recording input mode setting operation. When a user may depress "RECORDING" button, the console section may issue a bus connection protection request signal and may issue a bus connection cancel signal based on the data input end operation. The interface may execute the IEEE 1394 standard interface processing by using the bus use request signal, the bus connection protection request signal and the bus connection cancel signal as trigger signals.

Also, an internal bus 46 may be connected to the internal interface 42, and a RAM 47, a ROM 49 and a CPU 49 may be connected to this internal bus 46. The RAM 47 may be used to temporarily store a variety of data transmitted and received between the standard interface 41, the internal interface 42, the recording/reproducing section 43, the monitor 44, the console section 45, the ROM 48 and the CPU 49. The ROM 48 may have stored therein control programs necessary for recording/reproducing a recorded image. The CPU 49 may control the input and output of the recording/reproducing section 43, the monitor 44 and the console section 45 based on the control programs read out from the ROM 48.

In this example, when DV data such as a recorded image is transferred, the CPU 49 may issue a bus use request to the standard interface 41, and may control the input and output of the internal interface 42 in response to the standard interface 41. For example, when the DV deck 40 may become the input machine on the serial buses 60A to 60D, the central processing unit may search DV data flowing from the default channels on the serial buses 60A to 60D, may decode the DV data thus obtained by data search, and may execute a variety of information based on the decoded output.

Figure 6:
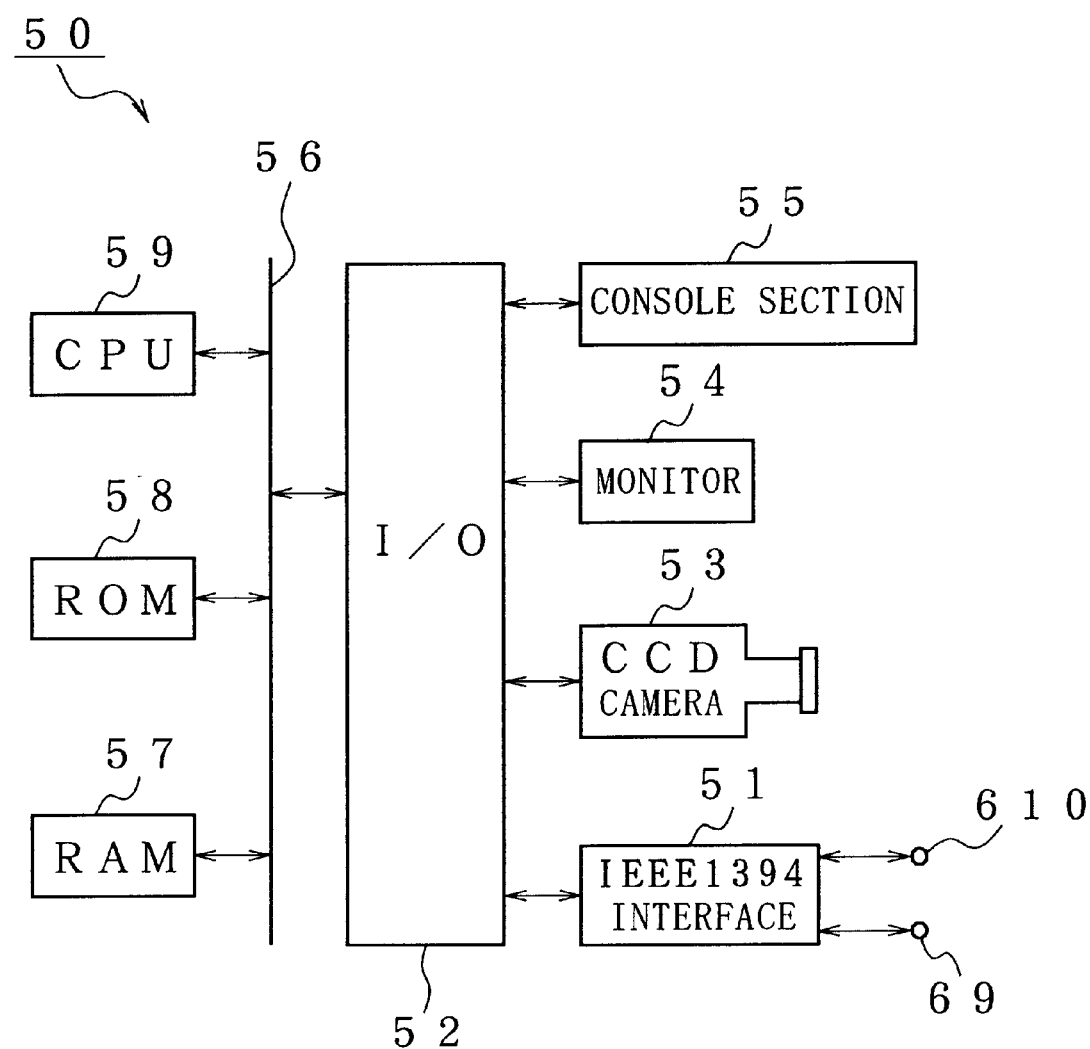
FIG. 6 is a block diagram showing an example of an arrangement of a built-in camera type video recorder 50.

Subsequently, an example of an arrangement of the DV camera/recorder 50 will be described with reference to FIG. 6. This DV camera/recorder 50 may include an IEEE 1394 standard bus/interface 51 shown in FIG. 6. The standard interface 51 may include two external input/output terminals 69, 610. One external input/output terminal 69 may be connected to the serial bus 60D and thereby connected to the DV deck 40. The other input/output terminal 610 may be connected to other digital household appliances. An example of an arrangement of the inside of this standard interface 51 will be described with reference to FIG. 7.

An internal interface (I/O) 52 may be connected to this standard interface 51 to input and output a digital video signal (hereinafter referred to as DV data) in which an image of an object was picked up. A CCD camera 53 may be connected to the internal interface 52 to record an image of an object picked up real time on a digital video cassette, not shown, or reproduce a recorded image from the digital video cassette.

A monitor 54 such as a liquid-crystal display may be connected to this internal interface 52 to display title, year and date of a recorded image required upon recording/reproducing. In this example, when the serial bus 60D which was requested to be used may be in use, there may be executed an error processing which may display (notify) a message of "DV DATA CANNOT BE OUTPUTTED" on the monitor 54.

A console section (operation means) 55 may further be connected to the internal interface 52 by which a user may input title, year and date of a picked-up images upon recording/reproducing. In this example, when the DV camera/recorder 50 may be used as the output machine on the serial buses 60A to 60D, the console section may issue a bus use request signal based on a data output start operation and may issue a bus connection cancel signal based on a data output end operation. The interface may execute the IEEE 1394 standard interface processing by using these bus use request signal and bus connection cancel signal as trigger signals.

Also, an internal bus 56 may be connected to the internal interface 52, and a RAM 57, a ROM 58 and a CPU 59 may be connected to this internal bus 56. The RAM 57 may be used to temporarily store a variety of data transmitted and received between the standard interface 51, the internal interface 52, the recording/reproducing section 53, the monitor 54, the console section 55, the ROM 58 and the CPU 59. The ROM 58 may have stored therein control programs necessary for recording/reproducing a recorded image. The CPU 59 may control the input and output of the recording/reproducing section 53, the monitor 54 and the console section 55 based on the control programs read out from the ROM 58 upon recording/reproducing.

In this example, when DV data such as a recorded image is transferred, the CPU 59 may issue a bus use request to the standard interface 51, and may control the input and output of the internal interface 52 in response to the standard interface 51. For example, when the DV carmera/recorder 50 may become the output machine on the serial buses 60A to 60D, the central processing unit may output DV data to the default channels on the serial buses 60A to 60D.

Subsequently, the examples of the arrangements of the IEEE 1394 bus/interfaces 11, 21, 31, 41, 51, or the like will be described with reference to FIG. 7. The standard interface 11 shown in FIG. 7 may execute the interface processing of the serial buses 60A, 60B, 60C, 60D based on an IEEE 1394 standard communication protocol. Other standard interfaces 21, 31, 41, 51 also may have the same arrangement and function and therefore need not be described.

The standard interface 11 shown in FIG. 7 may include a communication control section 71 connected to the serial buses 60A, 60B, 60C, 60D, or the like. In this example, the control communication section 71 of each of the standard interfaces 11, 21, 31, 41, 51 may limit the output machines, which can uselessly output data to the serial buses 60A, 60B, 60C, 60D, to one of the IRD receiver 10, the mini disc 20, the D-VHS apparatus 30, the DV deck 40 and the DV camera/recorder 50.

In accordance with this control, when the mini disc 20, the D-VHS apparatus 30 and the DV deck 40 used as the input machines on the serial buses 60A, 60B, 60C, 60D may not issue an input request, data can be avoided from being outputted from the IRD receiver 10 and the DV camera/recorder 50 to the serial buses 60A, 60B, 60C and 60D in a multiplexed fashion, thereby preventing the bus resources from being used uselessly.

This communication control section 71 may have connected thereto control lines to transfer IEEE 1394 standard control signals. The communication control section 71 may have connected thereto an application memory 72 in which there may be stored command information indicating a message of "ESTABLISH TRANSMISSION LINE BETWEEN ELECTRONIC DEVICES WHICH ISSUED REQUESTS TO USE BUS", for example. This command information may be read out from the application memory when a request to use bus may be issued.

In this example, the application memory 72 may output command information to the communication control section 71 based on the bus use request signals issued from the respective console sections 15, 25, 35, 45, 55 of the IRD receiver 10, the mini disc 20, the D-VHS apparatus 30, the DV deck 40, the DV camera/recorder 50. For example, when a user may record music information on the mini disc 20 upon digital satellite broadcasting, if the user turns on the console section 25 of the mini disc 20, then a command indicating "ESTABLISH TRANSMISSION LINE BETWEEN IRD APPARATUS 10 AND MINI DISC 20" may be outputted to the communication control section 71 from the application memory 72. In order to secure a default channel (virtual plug) to which data is transferred, the communication control section 71 may generate a read transaction. Also, the communication control section 71 may confirm based on a read response transaction which becomes an answer to the read transaction whether or not there is a blank channel.

The communication control section 71 may have connected thereto an IEEE 1394 standard device driver 73. The device driver 73 may include an isochronous resource manager (IRM: Isochronous Resource Manager) 74 to transmit an isochronous signal for effecting an IEEE 1394 standard interface processing through an IEEE 1394 standard internal bus 77 and serial gates 78, 79 to the serial buses 60A to 60D. The isochronous resource manager 74 may include a bandwidth available register (Bandwidth Available Register: BAR) 75 in which the number of bandwidths of transmission line may be written and a channel available register (Channels Available Register: CAR) 76 in which default channels may be written.

That is, the channel available register 76 may be an example of a memory means for memorizing default channels and may control on the serial buses virtual connection plugs which can connect electronic devices serving as output machines on the serial buses 60A to 60D and electronic devices serving as input machines on the serial buses 60A to 60D. In this example, there may be prepared 1 to 63 channels as virtual connection plugs. The isochronous resource manager 74 may subtract the number of bandwidths of available transmission lines from the number of whole bandwidths and calculate the number of remaining bandwidths when the interface processing may be effected. Thus, there may be determined the number of bandwidths of the available transmission lines. In this example, the blank channel may be acquired by maintaining the bits of the available channels on the channel available register 76.

An IEEE standard internal bus 77 connected to the isochronous resource manager 74 may be connected to the internal interface 12 of the IRD receiver 10 in which there are provided the IEEE 1394 standard bus/interface 11, or the like, and may be connected to a pair of serial gates 78, 79. One serial gate 79 may be connected to the input/output terminal 61, and the other serial gate 78 may be connected to the input/output terminal 62. These serial gates 78, 79 may be controlled by the isochronous resource manager 74, the virtual channel management section 81 and the communication control section 71. Internal arrangements of the isochronous resource manager 74 and its peripheral circuits of other mini disc 20, the D-VHS apparatus 30, the DV deck 40 and the DV camera/recorder 50 are similar, and therefore need not be described.

Under control of the communication control section, when a transmission line between the IRD apparatus 10 and the mini disc 20 may be established, the output plug of the IRD receiver 10 and the input plug of the mini disc 20 may be connected together electrically and exclusively, and the serial gates 78, 79 may be closed so as to prevent DV data from flowing from other serial bus 60D. Under this control, the IRD apparatus 10 and the mini disc 20 in which the transmission line was established can be protected.

A virtual channel (plug) management section may be connected to the IEEE 1394 standard internal bus 77. The virtual channel management section 81 may include a plug control register (Plug Control Register: PCR) 82 in which there may be written data in accordance with an access rule of an audio signal or a video signal in the digital interface. This plug control register 82 may include an output PCR (Output Plug Control Register: OPCR) 83 and an input PCR (Input plug Control Register: iPCR) 84.

The virtual channel management section 81, for example, may read out the output PCR 83 from the plug control register 82 in response to the read transaction from the communication control section 71, and may output the read-out result to the communication control section 71 as a read response transaction. The virtual channel management section 81 may write predetermined bandwidths (data rates: 100 Mbit/s, 200 Mbit/s, 400 Mbit/s are prepared in this example) and channels in the output PCR 83 in response to a write transaction from the communication control unit 71. Then, the virtual channel management section 81 may control the hardware such as the serial gates 78, 79 in such a manner that a data communication can be made in accordance with set conditions written in the output PCR 83.

Under control of the virtual channel management section, the IEEE 1394 isochronous resource manager 74 may monitor the bandwidth available register 75 and the channel available register 76, and the IRD receiver 10 and the DV camera/recorder 50 which may be served as the output machines may output data of default channels. When such default channels are protected, they may be controlled so as to output data to the blank channel. Also, they may be controlled so as to input data from the default channel to the mini disc 20, the D-VHS apparatus 30 and the DV deck 40 which may be served as the input machines. When the default channel may be protected, they may be controlled so as to input data from the default channel.

An example of an operation of the communication system 100 according to this embodiment will be described with reference to FIGS. 8 to 12. In this example, let it be assumed that an isochronous signal which may guarantee the transmission and reception of packets of a constant amount will flow on the serial buses 60A to 60D. The mini disc 20, the D-VHS apparatus 30 and the DV deck 40 may sequentially search the isochronous signal, may select desired MPEG data or DV data which can be decoded by the mini disc 20, the D-VHS apparatus 30 or the DV deck 40 and may input only the selected MPEG data or DV data. Accordingly, MPEG data based on the moving picture compression system may be transferred between the IRD apparatus 10, the mini disc 20 and the D-VHS apparatus 30, and DV data may be transferred between the DV deck 40 and the DV camera/recorder 50.

Also, when the serial bus which was requested to be used may be in use, there will be executed an error processing which may notify that data cannot be outputted or inputted. In this example, let it be assumed that, with respect to the retrieval of blank channel, initially the channel "63" may be searched and that when such channel is in use, the retrieval is returned to the channel "1", and the channels from "1" to "63" may be searched, in that order.

In accordance with these communication conditions, in this example, let us describe the operation of the communication system on the following assumptions:

(1) A reproduced picture from the DV camera/recorder 50 may be recorded (dubbed) by the DV deck 40;

(2) Reproduced sounds from the IRD receiver 10 may be recorded by the mini disc 20 during dubbing;

(3) Searching movies received at the IRD receiver 10 and recording a selected movie by the D-VHS apparatus 30 during the dubbing and reproduced sounds of the IRD receiver 10 being recorded on the mini disc 20;

(4) Operation of the DV camera/recorder 50 and the DV deck 40 at the completion of the dubbing;

(5) Operation executed when the recording by the mini disc 20 is ended; and (6) Continuously receiving the IRD receiver 10 after the end of the recording and recording reproduced sounds of the receiver on the mini disc 20 one more time.

(1) EFFECT RECORDING BETWEEN DV CAMERA/RECORDER AND DV DECK:

Initially, a user may connect the IRD receiver 10, the mini disc 20, the D-VHS apparatus 30, the DV deck 40 and the DV camera/recorder 50 by the IEEE 1394 standard serial buses 60A, 60B, 60C, 60D as shown in FIG. 1. Thereafter, in order to record an event from the DV camera/recorder 50 to the DV deck 40, the user may depress an operation button concerning "PLAY" by operating the main body of the DV camera/recorder 50 or with a remote controller. Also, the user may depress an operation button concerning "REC" by operating the main body of the DV deck 40 or a remote controller.

Figure 8:
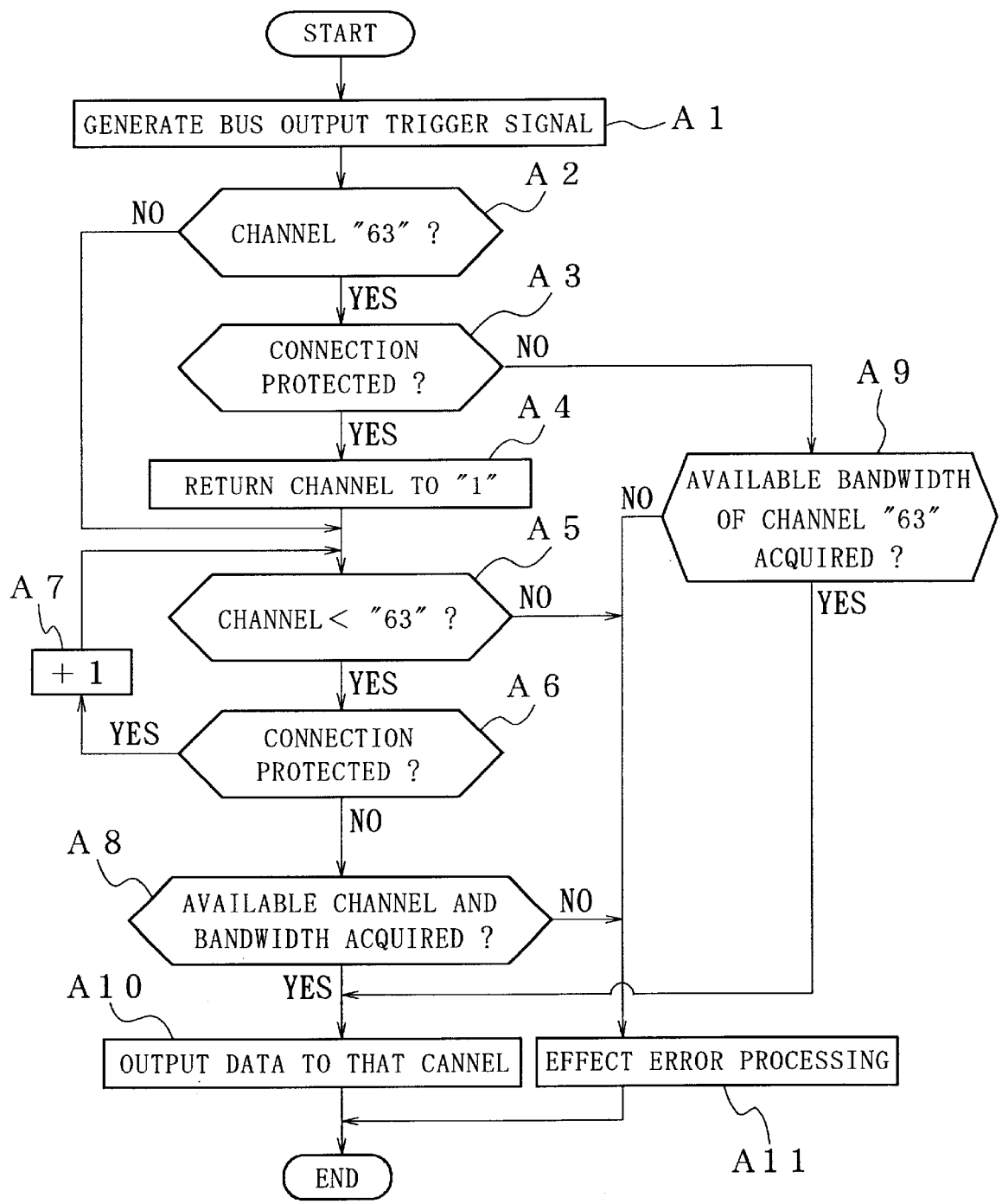
FIG. 8 is a flowchart to which reference will be made in explaining output operations of electronic devices used as output machines in the serial buses 60A to 60D.
Figure 9:
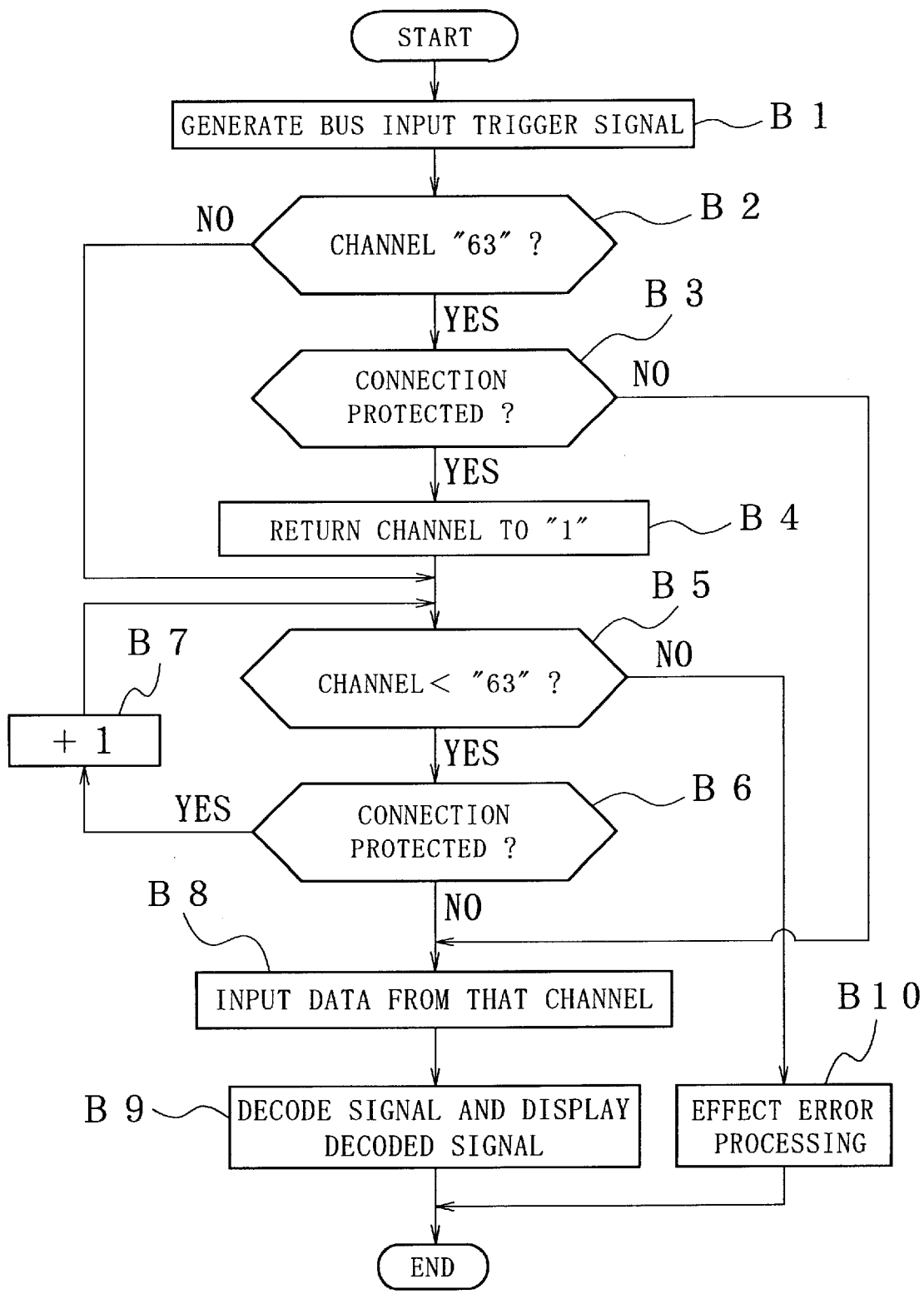
FIG. 9 is a flowchart to which reference will be made in explaining input operations of electronic devices used as input machines in the serial buses 60A to 60D.
Figure 10:
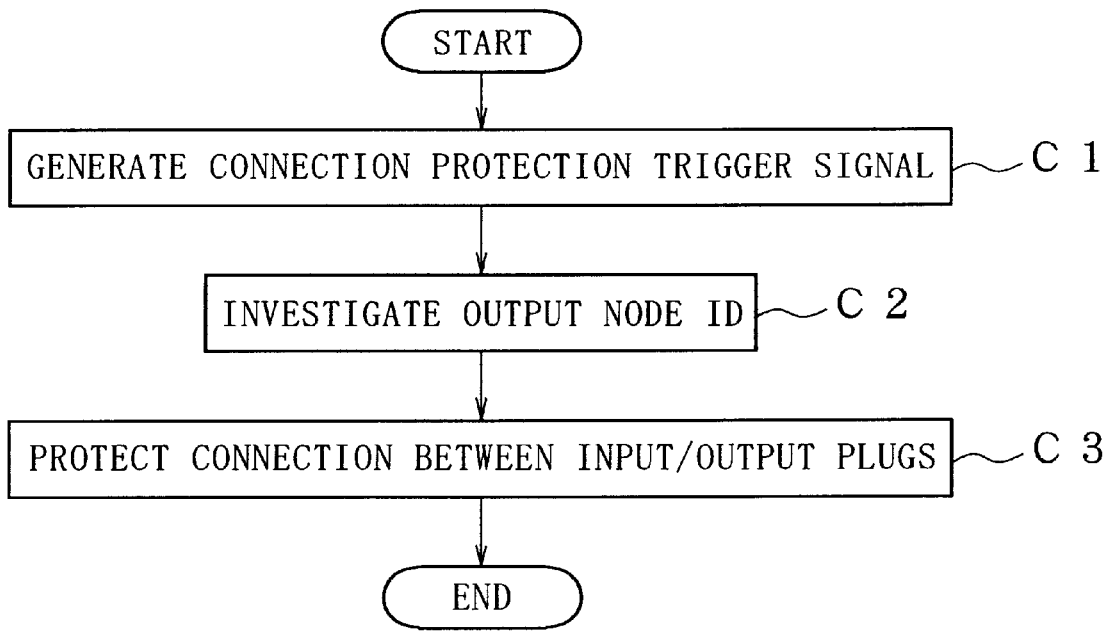
FIG. 10 is a flowchart to which reference will be made in explaining the operations executed when the connections of the electronic devices connected to the serial buses 60A to 60D are protected.
Figure 11:
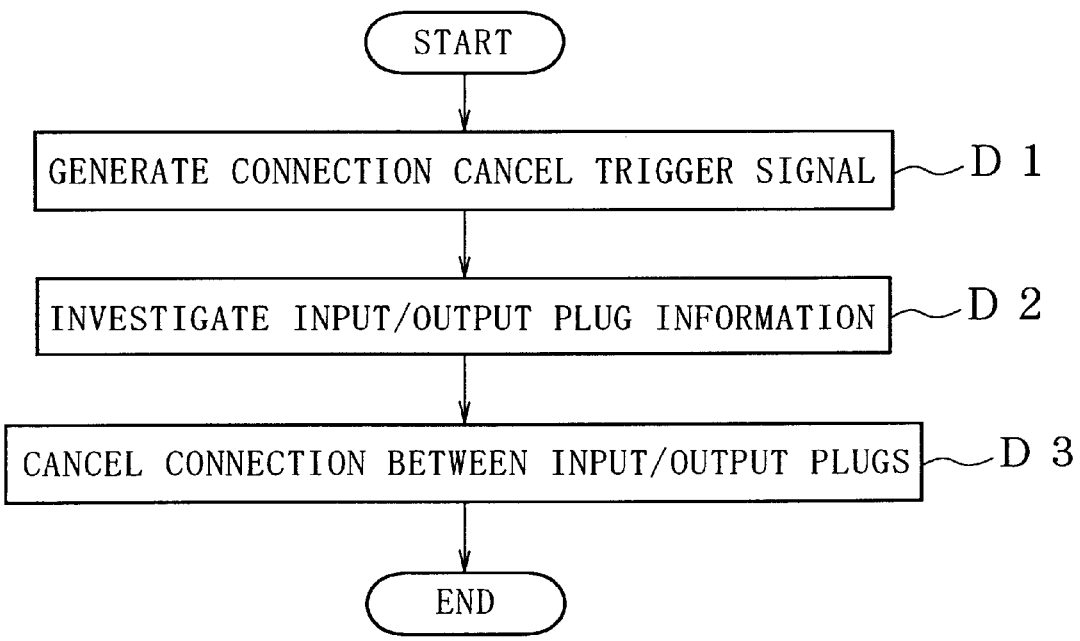
FIG. 11 is a flowchart to which reference will be made in explaining the operations executed when the connections of the electronic devices connected to the serial buses 60A to 60D are canceled.

At that very moment, the DV camera/recorder 50 which may become the output machine on the 1394 serial bus 60D may generate a bus output trigger signal at a step A1 of a flowchart shown in FIG. 8. This pulse output trigger signal may be based on a bus use request signal generated when the user turned "PLAY" ON by operating the main body of the DV camera/recorder 50 or by operating the remote controller.

When this bus use request signal is inputted to the application memory 72 of the standard interface 51 of the DV camera/recorder 50, the application memory 72 shown in FIG. 7 may output to the communication control section 71 a command indicating "ESTABLISH TRANSMISSION LINE BETWEEN DV CAMERA/RECORDER 50 AND DV DECK 40" based on this bus use request signal.

This communication control section 71 may exchange data between it and the device driver 73 in response to the command from the application memory 72 to thereby acquire the bandwidth (data rate) and the channel required to transfer data on the serial bus 60D.

For example, in the isochronous resource manager 74, the bandwidth may be read out from the bandwidth available register 75, and the channel "63" may be read out from the channel available register 76. As the bandwidth required to transfer DV data, the isochronous resource manager 74 may subtract the bandwidth of the available transmission line from the whole bandwidth, and may calculate the remaining bandwidth. Thus, the bandwidth of the available transmission line may be determined.

In this example, the blank channel may be acquired by securing the bits of virgin channel on the channel available register 76. For example, the communication control section 71 may output the read transaction to the virtual channel management section 81 in order to secure the default channel (virtual plug) for transferring DV data. In the virtual channel management section 81, the output PCR 83 may be read out from the plug control register 82 in response to the read transaction from the communication control section 71, and a read-out result may be outputted to the communication control section 71 as an answer to the above-mentioned read transaction. This answer may be the read response transaction.

Then, at steps A2 to A8, it is determined by the standard interface 51 within the DV camera/recorder 50 whether or not the default channel of the output destination is blank. For example, it is checked at the step A2 whether or not the default channel is "63". The communication control section 71 which has received the answer of the read transaction may confirm on the basis of the read response transaction whether or not there is a blank channel. In this example, it can be understood that the channel "63" is not occupied. Accordingly, if the default channel is "63", then control goes to the step A3.

It is determined at the step A3 whether or not the connection of the default channel "63" is protected. In this example, since the connection of the channel "63" is not protected, control goes to the step A9, whereat it is determined whether or not the channel "63" and the available bandwidth are acquired. At that very moment, the virtual channel management section 81 may write the predetermined bandwidth (data rate) and the channel "63" in the output PCR 83 in response to the write transaction. It can be determined based on the existence of this writing whether or not the channel "63" and the bandwidth can be acquired.

Thereafter, control goes to a step A10, whereat DV data may be outputted to the channel "63". At that very moment, the virtual channel management section 81 may control the hardware in accordance with the set conditions written in the output PCR 83 such that a communication can be made on the serial bus 60D. For example, the communication control section 71 may output the write transaction to the device driver 73 in order to secure the input plug of the DV deck 40.

This device driver 73 may send the write transaction from the communication control section 71 to the serial bus 60D. When receiving the write response transaction from the DV deck 40, the communication control section 71 may confirm that the writing in the input PCR 84 may be successful. Also, in actual practice, the communication control section may transfer DV data to the DV deck 40.

If it is determined at the step A2 that the default channel is not "63", if it is determined at the step A3 that the connection of the channel "63" was already protected, and if the default channel is returned to "1", then control goes to the step A5 in order to search a blank channel.

In the step A5, the search number of the default channel may be returned to "1", and the search of the default channel may be started from "1" to the high-order "63". For example, control goes to a step A6, whereat it is determined whether or not the connection of the default channel "1" is protected. If the connection of the channel "1" is not protected, then control goes to a step A8. If the connection of the channel "1" is already protected, then control goes to a step A7, whereat the search number is incremented by one (+1), and control goes back to the step A5. In the step A5, it is determined whether or not the default channel may become "63". If the default channel is "63", then the blank channel may not be available, and control goes to a step A11, whereat an error processing may be executed. For example, a message indicating "DV DATA CANNOT BE OUTPUTTED" may be displayed (notified) on the monitor 54 of the DV camera/recorder 50.

If the blank channel is discovered at the step A6, then control goes to the step A8, whereat it is determined whether or not the default channel and the available bandwidth could be acquired. If the default channel and the available bandwidth could be acquired, then control goes to the step A 10, whereat DV data is outputted to the default channel "1". If it is determined at the step A5 that there are no blank channels available and if the default channel and the available bandwidth could not be acquired at the steps A8 and A9, then control goes to a step A11, whereat the DV camera/recorder 50 may execute the error processing.

Further, when the user sets the DV deck 40 to the recording input mode, the deck is switched from the VTR-stop state to the DV input mode. Accordingly, the DV deck 40 which may become the input machine on the 1394 serial bus 60D may generate a bus input trigger signal at a step B1 of a flowchart shown in FIG. 9. This input trigger signal may be based on the bus use request signal generated when the deck is set to the recording input mode by operating the main body of the DV deck 40 or by operating the remote controller.

Thereafter, it is determined at steps B2 to B7 on the basis of the bus input trigger signal by the standard interface 41 within the DV deck 40 whether or not an isochronous signal that can be inputted flows through the default channel of the input destination. Here, the type of the isochronous signal can be understood by reading a packet header. For example, it is determined at the step B2 whether or not the default channel is "63". If the default channel is "63", then control goes to a step B3.

It is determined at the step B3 whether or not the isochronous signal that can be inputted may flow through the channel "63". If the isochronous signal that can be inputted may flow through the channel "63", then control goes to a step B8, whereat the isochronous signal is inputted from the channel "63". Then control goes to a step B9, whereat the DV data is decoded and displayed on the monitor 44 of the DV deck 40, or the like.

In this example, when the write transaction is received by the DV deck 40 from the serial bus 60D, the predetermined available bandwidth and the channel "63" may be written in the input PCR 84 of the DV deck 40 in response to the write transaction. When the writing in the input PCR 84 is successful, the DV deck 40 may send such message to the serial bus 60D.

Also, if it is determined at the step B2 that the default channel is not "63", if it is determined at the step B3 that the isochronous signal that can be inputted does not flow through the channel "63" or if the default channel is "1", then control goes to the step B5 in order to search a channel through which the isochronous signal may flow.

At the step B5, the search number concerning the default channel is returned to "1", and the search is started from the default channel "1" to the high-order channel "63". For example, control goes to a step B6, whereat it is determined whether or not the connection of the default channel "1" is protected. If the connection of the channel "1" is not protected, then control goes to the step B8. If the connection of the channel "1" is already protected, then control goes to a step B7, whereat the search number is incremented by one (+1), and control goes back to the step B5. In the step B5, it is determined whether or not the default channel reaches "63". If the default channel does not reach "63", there is then the possibility that there will exist a channel through which the isochronous signal flows. Hence, control goes to the step B7, whereat the search is continued.

If the isochronous signal that can be inputted is discovered at the step B6, then control goes to the step B8, whereat the isochronous signal is inputted from the channel "63". Thereafter, control goes to a step B9, whereat the isochronous signal is decoded and displayed on the monitor 44, or the like.

Also, if the isochronous signal that can be inputted is not discovered at all in the step B5, then control goes to a step B10, whereat the error processing is effected on the DV deck 40. For example, a message indicating "DV DATA CANNOT BE INPUTTED" is displayed (notified) on the monitor 44 of the DV deck 40.

Accordingly, if the isochronous signal that can be inputted is received, then the user can visually confirm a picture reproduced from the DV camera/recorder 50 on the basis of the image on the monitor 44 of the DV deck 40. Here, the user may depress the recording button of the DV deck 40 for the first time. Then, the DV deck 40 may generate a connection protection trigger signal at a step C1 of a flowchart shown in FIG. 10 concerning the connection protection between electronic devices. The connection protection trigger signal generated at that time may be based on the bus connection protection request signal generated when "REC" button of the DV deck 40 is turned ON.

Thereafter, control goes to a step C2, whereat the DV deck 40 may search the packet header of the default channel "63" based on the connection protection trigger signal to thereby search an output node ID. In this example, the DV camera/recorder 50 may be written in the output node ID. Therefore, the DV deck 40 may recognize that the node which outputs DV data is the DV camera/recorder 50.

Accordingly, at a step C3, a connection between the output plug of the DV camera/recorder 50 serving as the output machine and the input plug of the DV deck 40 which is the input machine (input machine itself) may be protected. At that very moment, the isochronous resource manager 74, the virtual channel management section 81 and the communication control section 71 may close the serial gate 78 or 79 of the standard interfaces 41, 51 such that MPEG data can be prevented from flowing from other serial buses 60A to 60C. In this example, the serial gate 78 or 79 side connected to the serial bus 60C is closed.

By this control, a transmission line between the DV camera/recorder 50 and the DV deck 40 may be established and the output plug of the DV camera/recorder 50 and the input plug of the DV deck 40 may be connected electrically and exclusively, whereby the picture reproduced from the DV camera/recorder 50 can be recorded by the DV deck 40.

(2) EFFECT RECORDING BETWEEN IRD RECEIVER 10 AND MINI DISC 20 DURING RECORDING EFFECTED BETWEEN DV CAMERA/RECORDER AND DV DECK:

Let us describe the case in which a user wants to record a piece of favorite music on the mini disc 20 while listening to a music program from the IRD receiver 10 during a picture reproduced from the DV camera/recorder 50 is being recorded by the DV deck 40.

In this example, with respect to the default channel "63", DV data may be outputted from the DV camera/recorder 50 to the DV deck 40. Further, this DV data may be protected between the DV camera/recorder 50 and the DV deck 40. Let it be assumed that the default channels "1" to "62" may be unoccupied. Accordingly, the channel "63" cannot be used and taken away.

In such situation, if a music program is received at the IRD receiver 10, data may be outputted to other default channel by using such selection as a trigger signal. At that very moment, the IRD receiver 10 which may become the output machine on the 1394 serial bus 60A may generate a bus output trigger signal at the step A1 of the flowchart shown in FIG. 8. This bus output trigger signal may be based on the bus use request signal generated when a user operates the main body of the IRD receive 10 or a user turns on "REC MODE" with a remote controller.

Thereafter, it is determined at the steps A2 to A8 on the basis of the bus output trigger signal by the standard interface 11 within the IRD receiver 10 whether or not the default channel of the output destination is unoccupied. In this example, since the connection of the channel "63" is already protected at the step A2, control goes to the step A5.

At the step A5, the default channel "1" is searched. Thereafter, since it is confirmed at the step A6 that the connection of the channel "1" is not protected, control goes to the step A8, whereat it is determined whether or not the available channel and the bandwidths could be acquired. Then, control goes to the step A10, whereat MPEG data (digital audio signal) is outputted to the channel "1".

If it is determined at the step A5 that there may exist no blank channel and if it is determined at the step A8 that the default channel and the bandwidths could not be acquired, then control goes to the step A 11, whereat the error processing may be effected on the IRD receiver 10. For example, a message indicating "MPEG DATA CANNOT BE OUTPUTTED" may be displayed (notified) on the monitor 14 of the IRD receiver 10.

Also, if a user depresses a recording search button of the mini disc 20, then the mini disc is switched from the disc-stop state to the recording search state. Accordingly, the mini disc 20 which may become the input machine on the 1394 serial bus 60A may generate a bus input trigger signal at the step B1 of the flowchart shown in FIG. 9. This bus input trigger signal may be based on the bus use request signal which may be generated when a user operates the main body of the mini disc 20 or a user sets the recording search button by operating the remote controller.

Thereafter, it is determined at the steps B2 to B7 on the basis of the bus input trigger signal by the standard interface 21 within the mini disc 20 whether or not the isochronous signal that can be inputted may flow through the default channel of the input destination. The type of isochronous signal can be known by reading the packet header. In this example, since the connection of the channel "63" between the DV camera/recorder 50 and the DV deck 40 may be protected at the step B2 and this channel cannot be received, control goes to the step B5.

If the default channel "1" is searched at this step B5, then it can be understood on the basis of header information that MPEG data (digital audio signal) flows through the channel "1". That is, the isochronous channel that can be inputted may flow through such channel. Accordingly, since the isochronous signal that can be inputted may be discovered at the step B6, control goes to the step B8, whereat the isochronous signal is inputted from the default channel "1". Thereafter, control goes to the step B9, whereat the isochronous signal is decoded and displayed on the monitor 24 of the mini disc 20, or the like. If it is determined at the step B5 that no isochronous signal is discovered at all, then control goes to the step B10, whereat the error processing may be effected on the mini disc 20. For example, a message indicating "MPEG DATA CANNOT BE INPUTTED" may be displayed (notified) on the monitor 24 of the mini disc 20.

At that very moment, since the user can recognize the satellite broadcasting program (favorite music) from the IRD receiver 10 on the basis of images on the monitor 24 of the mini disc 20 or sounds reproduced from the audio output section 210, the user may operate the main body of the mini disc 20 or a user may depress the recording button by operating the remote controller for the first time. Then, the mini disc 20 may generate a connection protection trigger signal at the step C1 of the flowchart shown in FIG. 10. The connection protection trigger signal may be based on the bus connection protection request signal generated when the "REC" button of the mini disc 20 may be turned on.

Then, control goes to the step C2, whereat the mini disc 20 may check the output node ID by searching the packet header of the default channel "1" based on the connection protection trigger signal. In this example, the IRD receiver 10 may be written in the output node ID. Therefore, the mini disc 20 may recognize that the node which might output MPEG data is the IRD receiver 10.

Accordingly, a connection between the output plug of the IRD receiver 10 which is the output machine and the input plug of the mini disc 20 which is the input machine (input machine itself may be protected at the step C3. Thus, the mini disc 20 can record reproduced sounds of the satellite broadcasting program received at the IRD receiver 10.

(3) RECORD MOVIE RECEIVED AT IRD RECEIVER BY D-VHS APPARATUS WHEN RECORDING IS EFFECTED BETWEEN IRD RECEIVER AND MINI DISC DURING RECORDING IS BEING EFFECTED BETWEEN DV CAMERA/RECORDER AND DV DECK:

Let us describe the case in which a user finds out a favorite movie from a satellite broadcasting program and wants to record such movie while the user records the favorite music on the mini disc 20 when the user listens to a music program with the IRD receiver 10 during pictures reproduced from the DV camera/recorder are recorded on the DV deck 40.

In this example, with respect to the default channel "63", DV data may be outputted from the DV camera/recorder 50 to the DV deck 40, and this DV data may be protected between the DV camera/recorder 50 and the DV deck 40.

Further, with respect to the default channel "1", MPEG data may be outputted from the IRD receiver 10 to the mini disc 20, and this MPEG data may be protected between the IRD receiver 10 and the mini disc 20.

Let us assume that default channels "2" to "62" are made blank. Accordingly, the channels "63" and "1" cannot be taken away as well as they cannot be used.

In such a situation, when the movie program is selected by the IRD receiver 10, it is intended to output data to other default channel by using such selection as a trigger signal. At that very moment, the IRD receiver 10 which becomes the output machine on the 1394 serial bus 60B may generate the bus output trigger signal at the step A1 of the flowchart shown in FIG. 8. This bus output trigger signal may be based on the bus use request signal generated when a user turns on "REC MODE" by operating the main body of the IRD receiver 10 or by operating the remote controller.

Thereafter, it is checked at the steps A2 to A8 by the standard interface 11 on the basis of the bus output trigger signal whether or not the default channels of the output destination are unoccupied. In this example, since the connection of the default channel "63" may already be protected at the step A2, control goes to the step A5.

At the step A5, the default channel "1" is searched, and then it can be recognized at the step A6 that the connection of the default channel "1" may also be protected. Thus, control goes to the step A7, whereat the search channel is incremented by one (+1), and then control goes back to the step A5. At the step A5, the default channel "2" may be searched. Then, since it can be recognized at the step A6 that the connection of the channel "2" is not protected, control goes to the step A8, whereat it is determined whether or not the available channel and the bandwidths could be acquired. Thereafter, control goes to the step A10, whereat MPEG data (digital video signal) may be outputted to the default channel "2".

If it is determined at the step A5 that there exists no unoccupied channel and if it is determined at the step A8 that the default channel and the bandwidths could not be acquired, then control goes to the step A11, whereat the error processing may be effected on the IRD receiver 10. For example, a message indicating "MPEG DATA CANNOT BE OUTPUTTED" may be displayed (notified) on the monitor 14 of the IRD receiver 10.

Also, when the user may set the D-VHS apparatus 30 to the recording input mode, the above-mentioned apparatus may be switched from the VTR-stop state to the recording input mode. Accordingly, the D-VHS apparatus 30 which may become the input machine on the 1394 serial bus 60B may generate a bus input trigger signal at the step B1 of the flowchart shown in FIG. 9. This bus input trigger signal may be based on the bus use request signal generated when the user sets the apparatus to the recording input mode by operating the main body of the D-VHS apparatus 30 or by operating the remote controller.

Thereafter, it is determined at the steps B2 to B7 on the basis of the bus input trigger signal by the standard interface 31 within the D-VHS apparatus 30 whether or not the isochronous signal that can be inputted flows through the default channel of the input destination. That is, this is what might be called an i link search operation. Here, the type of the isochronous signal may be understood by reading the packet header. In this example, at the step B2, since the connection of the default channel "63" was already protected between the DV camera/recorder 50 and the DV deck 40 and this default channel cannot be received, control goes to the step B5.

At this step B5, the default channel "1" may be searched. At that very moment, if the connection protection of the mini disc 20 is canceled, at the step B6, the MPEG data (digital audio signal) received at the IRD receiver 10 can be inputted by the D-VHS apparatus 30 also. However, since the user can recognize that such data may not be a movie, at the step B7, the default channel may be incremented by one (+1) and the research operation may be carried out again. Accordingly, control goes to the step B5, whereat the default channel "2" may be searched. Then, at the step B6, it can be recognized from header information that MPEG data (digital video signal) flows through the channel "2". That is, the isochronous signal that can be inputted flows through such channel.

Accordingly, since the isochronous signal that can be inputted is discovered at the step B6, control goes to the step B8, whereat the isochronous signal may be inputted from the channel "2". Thereafter, control goes to the step B9, whereat the isochronous signal may be decoded and displayed on the monitor 34 of the D-VHS apparatus 30. If it is determined at the step B5 that there may exist no isochronous signal that can be inputted, control goes to the step B10, whereat the error processing may be effected on the D-VHS apparatus 30. For example, a message indicating "MPEG DATA CANNOT BE INPUTTED" may be displayed (notified) on the monitor 34 of the D-VHS apparatus 30.

At that very moment, the user may recognize by the D-VHS apparatus 30 that the image on the monitor 34 may be the satellite broadcasting program (favorite movie) received at the IRD receiver 10. Therefore, for the first time, the user may depress the recording button by operating the main body of the D-VHS apparatus 30 or by operating the remote controller. Then, the D-VHS apparatus 30 may generate the connection protection trigger signal at the step C1 of the flowchart shown in FIG. 10. The connection protection trigger signal obtained at that time may be based on the bus connection protection request signal generated when the use turns on "REC" button of the D-VHS apparatus 30.

Thereafter, control goes to the step C2, whereat the D-VHS apparatus 30 may check the output node ID by searching the packet header of the default channel "2" based on the connection protection trigger signal. In this example, the IRD receiver 10 may be written on the output node ID. Therefore, the D-VHS apparatus 30 may recognize that the node which outputs MPEG data may be the IRD receiver 10.

Accordingly, at the step C3, the connection between the output plug of the IRD receiver 10 which is the output machine and the input plug side of the D-VHS apparatus 30 which is the input machine (input machine itself may be protected. Thus, a reproduced picture of a movie program of a satellite broadcasting received at the IRD receiver 10 can be recorded by the D-VHS apparatus 30.

(4) OPERATION EFFECTED WHEN DUBBING BETWEEN DV DECK AND DV CAMERA/RECORDER IS ENDED:

In this example, let us assume that dubbing between the DV deck and the DV camera/recorder is ended. In this case, the user may depress a playback stop button of the DV camera/recorder 50 which is the output machine. Then, the DV camera/recorder 50 may generate a connection cancel trigger signal at a step D1 of a flowchart shown in FIG. 11 when the connection between electronic devices is canceled. The connection cancel trigger signal obtained at that time may be based on a bus connection cancel request signal generated when the user may turn on "PLAY STOP" of the DV camera/recorder 50.

Thereafter, control goes to a step D2, whereat information between the output plug and the input plug of the output node whose connection was protected may be searched. For example, the DV camera/recorder 50 may check the output node ID by searching the packet header of the default channel "63" on the basis of the connection cancel trigger signal. In this example, the DV camera/recorder 50 may be written in the output node ID.

Accordingly, at the step D3, the connection between the output plug of the DV camera/recorder 50 which may be the output machine (output machine itself) and the input plug of the DV deck 40 which may be the input machine may be canceled. Thus, the electrical and exclusive connection between the DV camera/recorder 50 and the DV deck 40 may be canceled.

Thereafter, the user may depress the recording stop button of the DV deck 40 which may be the input machine. Then, the DV deck 40 may generate a bus resource return trigger signal at a step E1 of a flowchart of returning bus resource between electronic devices of FIG. 12. The bus resource return trigger signal obtained at that case may be based on a bus resource return request signal generated when the user turns on "REC STOP" button of the DV deck 40.

Thereafter, control goes to a step E2, whereat the exclusively-used channel "63" may be returned based on the bus resource return trigger signal under management of the IEEE 1394 standard interface 11, or the like. The standard interface 11 may acquire the control right of the corresponding communication system. Thereafter, control goes to a step E3, whereat the bandwidth which was similarly exclusively used may be returned under management of the interface 11 similarly. Thus, the channel "63" may become unoccupied, thereby increasing the number of available bandwidths.

(5) EFFECT OPERATION WHEN RECORDING ON MINI DISC IS ENDED:

In this example, let us assume that the recording of reproduced sounds from the IRD receiver 10 to the mini disc 20 may be ended after a music program or a piece of music received at the satellite broadcasting had been ended. In this case, the user may depress a playback stop button of the IRD receiver 10 which is the output machine. Then, the IRD receiver 10 may generate a connection cancel trigger signal at a step D1 of a flowchart of canceling a connection between electronic devices of FIG. 11. The connection cancel trigger signal obtained at that case may be based on a bus connection cancel request signal generated when the user turns on "PLAY STOP" button of the IRD receiver 10.

Thereafter, control goes to a step D2, whereat information between the output plug and the input plug of the output node whose connection was protected can be checked. For example, the IRD receiver 10 may check the output node ID by searching the packet header of the default channel "1". In this example, the IRD receiver 10 may be written in the output node ID.

Accordingly, at a step D3, there may be canceled the connection between the output plug of the IRD receiver 10 which is the output machine (output machine itself) and the input plug of the mini disc 20 which is the input machine. Thus, the electric and exclusive connection between the IRD receiver 10 and the mini disc 20 may be vanished.

Thereafter, the user may depress the recording stop button on the mini disc 20 which is the input machine. Then, the mini disc 20 may generate a bus return trigger signal at the step E1 of the return flowchart shown in FIG. 12 concerning the bus resource between electronic devices. The bus resource return trigger signal obtained at that case may be based on a bus resource return request signal generated when the user turns on "REC STOP" of the mini disc 20.

Thereafter, control goes to a step E2, whereat the channel "1" that was exclusively used may be returned under management of the interface 1 which might acquired the control right. Thereafter, control goes to a step E3, whereat the bandwidth that was similarly exclusively used may be returned to the interface 11. Thus, in addition to the channel "63", the channel "1" may become unoccupied, thereby further increasing the number of available bandwidths.

(6) RECORDING AGAIN ON MINI DISC 20 WHILE IRD RECEIVER 10 IS BEING CONTINUOUSLY RECEIVED AFTER RECORDING HAD BEEN FINISHED:

In this example, although the recording from the IRD receiver 10 to the mini disc 20 is ended, let us assume that the user may listen to a music program or other piece of music continuously. Also, let us assume that other default channels "1", "3", to "63" may become unoccupied and sufficiently large available bandwidth may be provided during the default channel "2" may be used by the IRD receiver 10 and the D-VHS apparatus 30.

For example, let us describe the case in which the user may record again a piece of favorite music on the mini disc 20 while listening to the music program received at the IRD receiver 10 during received pictures of a movie received at the IRD receiver 10 may be recorded by the D-VHS apparatus 30.

In this example, MPEG data (digital video signal) may be outputted from the IRD receiver 10 to the D-VHS apparatus 30 with respect to the default channel "2". Further, this MPEG data may be protected between the IRD receiver 10 and the D-VHS apparatus 30. Accordingly, the channel "2" cannot be taken away as well as they cannot be used.

In such a situation, if a music program is selected by the IRD receiver 10, then it is intended to output data to other default channel by using such selection as a trigger signal. In this example, each time there may be presented a different program or a piece of different music, the IRD receiver 10 may be returned from the channel "63" to the channel "1". Then, the channels may be searched from "1" to the high-order channel "63", and hence it is intended to output data to the unoccupied channel.

Accordingly, the IRD receiver 10 which may become the output machine on the 1394 serial bus 60A may generate a bus output trigger signal at the step A1 of the flowchart shown in FIG. 8. This output trigger signal may be based on the bus use request signal generated when the user turns on "REC MODE" by operating the main body of the IRD receiver 10 or by operating the remote controller.

Thereafter, it is determined at the steps A2 to A8 on the basis of the bus output trigger signal by the standard interface 11 within the IRD receiver 10 whether or not the default channel of the output destination is unoccupied. In this example, since it is determined at the step A2 that the default channel "63" may be unoccupied, control goes to the step A3. Since it can be understood at the step A3 that the connection of the channel "63" is not protected, control goes to the step A9.

At the step A9, it is determined whether or not the default channel "63" and the necessary available bandwidths could be obtained. If the channel "63" and the necessary available bandwidths are acquired, then control goes to the step A10, whereat MPEG data (digital audio signal) may be outputted to the channel "63". Accordingly, on the serial bus 60A, MPEG data (digital audio signal) may flow through the channel "63", and MPEG data (digital video signal) may flow through the channel "2".

If it is determined at the step A9 that the channel "63" and the bandwidths could not be acquired, then control goes to the step A11, whereat the error processing may be effected on the IRD receiver 10. For example, a message indicating "MPEG DATA CANNOT BE OUTPUTTED" may be displayed (notified) on the monitor 14 of the IRD receiver 10.

Also, if the user depresses the recording search button of the mini disc 20, then the mini disc is switched from the disc-stop state to the recording search state. Accordingly, the mini disc 20 which may become the input machine on the 1394 serial bus 60A may generate a bus input trigger signal at the step B1 of the flowchart shown in FIG. 9. This bus input trigger signal may be based on the bus use request signal generated when the user sets the recording search button by operating the main body of the mini disc 20 or by operating the remote controller.

Thereafter, it is determined at the steps B2 to B7 on the basis of the bus input trigger signal by the standard interface 21 within the mini disc 20 whether or not the isochronous signal that can be inputted may flow through the default channel of the input destination. The type of the isochronous signal may be known by reading the packet header. In this example, it can be understood at the step B2 that MPEG data (digital audio signal) may flow through the default channel "63". That is, there can flow the isochronous signal that can be inputted. Accordingly, control goes to the step B8, whereat the isochronous signal may be inputted from the default channel "63". Thereafter, control goes to the step B9, whereat the isochronous signal may be decoded and displayed on the monitor 24 of the mini disc 20, or the like.

At that very moment, since the user can recognize on the basis of the image on the monitor 24 of the mini disc 20 or reproduced sounds emanated from the audio output section that data is the satellite broadcasting program (piece of favorite music) received at the IRD receiver 10, the user may again depress the recording button by operating the main body of the mini disc 20 or by operating the remote controller. Then, the mini disc 20 may generate the connection protection trigger signal at the step B1 of the flowchart shown in FIG. 10. The connection protection trigger signal obtained at that case may be based on the bus connection protection request signal generated when the user turns on "REC" button of the mini disc 20.

Thereafter, control goes to the step B2, whereat the mini disc 20 may check the output node ID by searching the packet header of the default channel "63" based on the connection protection trigger signal. In this example, the IRD receiver 10 may be written in the output node ID. Therefore, the mini disc 20 may recognize that the node which may output the MPEG data is the IRD receiver 10.

Accordingly, the connection between the output plug of the IRD receiver 10 which may be the output machine and the input plug of the mini disc 20 which may be the input machine (mini disc itself) may be protected at the step B3. Thus, the mini disc 20 can record reproduced sounds of the satellite broadcasting program received at the IRD receiver 10.

In this manner, according to the communication control method and the communication system of this embodiment, when both of the DV camera/recorder 50 which becomes the output machine on the serial bus 60D and the DV deck 40 which becomes the input machine on the serial bus 60D may issue the request to use bus to the communication control section 71, the communication control section 71 may check whether or not the serial bus 60D which is the specific interval of the serial buses 60A to 60D which may be requested to be used may be in use. If the serial bus 60D of such specific interval is not in use, then such serial bus 60D may be made free to the DV camera/recorder 50 and the DV deck 40 which might request to use the serial bus, and the connection between the DV camera/recorder 50 and the DV deck 40 may be protected.

Further, when both of the IRD receiver 10 which becomes the output machine on the serial bus 60A and the mini disc 20 which becomes the input machine on the serial bus 60A may issue the request to use the bus to the communication control section 71, the communication control section 71 may check whether or not the serial bus 60A of the specific interval of the serial buses 60A to 60D which were requested to be used may be in use. If the serial bus 60A of such specific interval is not in use, then the serial bus 60A may be made free to the IRD receiver 10 and the mini disc 20 which requested to use the serial bus, and the connection between the IRD receiver 10 and the mini disc 20 may be protected.

When both of the IRD receiver 10 which becomes the output machine on the serial bus 60B and the D-VHS apparatus 30 which becomes the input machine on the serial bus 60B may issue the request to use bus to the communication control section 71, the communication control section 71 may check whether or not the serial bus 60B of the specific interval of the serial buses 60A to 60D which were requested to be used may be in use. If the serial bus 60B of such specific interval is not in use, then such serial bus 60B may be made free to the IRD receiver 10 and the D-VHS apparatus 30 which requested to use bus, and the connection between the IRD receiver 10 and the D-VHS apparatus 30 may be protected.

Accordingly, even when data used in the serial buses 60A to 60D have different signal formats like MPEG data and DV data, other serial buses 60A and 60B which were not requested to use by the DV camera/recorder 50 and the DV deck 40 at the same time may be made free to the IRD receiver 10 and the mini disc 20 and the IRD receiver 10 and the D-VHS apparatus 30. Also, the connection between IRD receiver 10 and the mini disc 20 and the connection between the IRD receiver 10 and the D-VHS apparatus 30 can be protected. Thus, since the serial buses 60A, 60B and 60D which may be obtained by dividing the IEEE 1394 standard communication control bus with the specific intervals can be used simultaneously, so long as the bus resource is unoccupied, multichannel signals and a variety of signals can be inputted and outputted.

Also, according to the embodiment of the present invention, when the IRD receiver 10 and the DV camera/recorder 50 are used as the output machines on the serial buses 60A to 60D, the operation sections 15, 55 may generate the bus use request signals based on the data output start operation of the user. Also, when the mini disc 20, the D-VHS apparatus 30 and the DV deck 40 are used as input machines on the serial buses 60A to 60D, the operation sections 25, 35, 45 may generate the bus use request signals based on the data input start operation of the user.

According to this arrangement, when the IRD receiver 10 and the DV camera/recorder 50 become the output machines on the serial buses 60A to 60D, data may be outputted to the default channels on the serial buses 60A to 60D based on the bus use request signals. Also, when the mini disc 20, the D-VHS apparatus 30 and the DV deck 40 become the input machines on the serial buses 60A to 60D, data which flow from the default channels on the serial buses 60A to 60D may be searched based on the bus use request signal. Then, input data obtained by this data search may be decoded, and a variety of information may be processed on the basis of this decoded output.

Accordingly, the user can switch the input with ease and can easily obtain desired music information (digital audio signal) and movie information (digital video signal) without selecting other electronic devices which are not in use and with no knowledge on the concept of the IEEE 1394 serial bus, for example. Thus, it is possible to alleviate the burden imposed upon the user when the user may operate the IRD receiver 10, the mini disc 20, the D-VHS apparatus 30, the DV deck 40 and the DV camera/recorder 50.

Also, according to this embodiment, when the DV camera/recorder 50 is used as the output machine on the serial buses 60A to 60D, if the DV camera/recorder 50 generates the bus connection cancel signal, then the IRD receiver 10 sequentially searches the default channels on the serial buses 60A to 60D on the basis of this bus connection cancel signal to thereby discover the unoccupied default channel "63", and can output MPEG data to the default channel "63".

According to this arrangement, the IRD receiver 10 which becomes the output machine can output data so long as the default channel and the bandwidth are made blank regardless of the signal formats which had already used the serial buses 60A to 60D. Accordingly, useless channels which can transmit data to the serial buses 60A to 60D can be constantly limited to one channel.

While the communication control section 71 is provided within the IEEE 1394 standard interfaces 11, 21, 31, 41, 51 of the IRD receiver 10, the mini disc 20, the D-VHS apparatus 30, the DV deck 40 and the DV camera/recorder 50 as described above, the present invention is not limited thereto. It is needless to say that the communication control section 71 may be provided within one of the standard interfaces 11, 21, 31, 41, 51 with similar effects being achieved.

Also, while the processing is returned from the channel "63" to the channel "1" to thereby check the protection of the connection when the isochronous signal is outputted as described above, the present invention is not limited thereto, and it is needless to say that a channel "0" may be introduced (for future expansion) and the processing may be returned from the channel "63" to the channel "1" to thereby check the protection of the connection.

Industrial Applicability

As described above, the communication control method and the communication system according to the present invention are extremely suitable for electric household appliances, a personal computer, peripheral equipment for such a personal computer and an external memory unit incorporated within such personal computer connected to a communication control bus such as an IEEE 1394 standard serial bus.

What is claimed is:

1. In a method of controlling a communication between a plurality of electronic devices connected by a communication control bus in a daisy-chain fashion, said communication control method comprising the steps of:

receiving bus use requests from both of an electronic device serving as an output machine on said communication control bus and an input machine serving as an input machine on said communication control bus;

checking whether or not a specific interval of said communication control bus which was requested in bus use is used; and opening said communication control bus of the specific interval to an electronic device of a signal input/output pair which were requested in use and protecting a connection between said electronic devices if said communication control bus of the specific interval from which said bus use request was issued is not in use.

2. A communication control method as claimed in claim 1, wherein said bus use requests from both of an electronic device which becomes an output machine on a remaining communication control bus and an electronic bus which becomes an input machine on said remaining communication control bus are received when a communication control bus of said specific interval which was requested to be used, it is checked whether or not other specific interval of the communication control bus which was requested to be used is in use, the communication control bus of said specific interval is made open to an electronic device of other signal input and output pair and a connection between said electronic devices is protected if the communication control bus of other specific interval which was requested to be used is not in use.

3. A communication control method as claimed in claim 1, wherein said electronic device which becomes an output machine on said communication control bus effects an error processing for notifying a message indicating that data cannot be outputted if the communication control bus of said specific interval which was requested to be used is in use.

4. A communication control method as claimed in claim 1, wherein said electronic device which becomes an input machine on said communication control bus effects an error processing for notifying a message indicating that data cannot be outputted if the communication control bus of said specific interval which was requested to be used is in use.

5. A communication control method as claimed in claim 1, wherein said communication control bus is an IEEE 1394 standard serial bus.

6. In a communication system in which a plurality of electronic devices are connected by a communication control bus in a daisy-chain fashion, a communication control system includes bus management control means which receives bus use requests of both of an electronic device which becomes an output machine on said communication control bus and an electronic device which becomes an input machine on said communication control bus, said bus management control means checks whether or not a specific interval of the communication control bus which was requested to be used is in use, said bus management control means opens the communication control bus of said specific interval to electronic devices of signal input and output pair which issued said requests to use bus and which protects a connection between said electronic devices if the communication control bus of said specific interval which was requested to be used is not in use.

7. A communication system as claimed in claim 6, further comprising memory means for memorizing a plurality of bus management default channels which can connect an electronic device which becomes an output machine on said communication control bus and an electronic device which becomes an input machine on said communication control bus and bus management control means for monitoring bus management default channels stored in said memory means, controlling the electronic device which becomes said output machine so as to output data to said default channels and controlling said electronic device such that said electronic device outputs data to said default channels if said default channel is protected, controlling the electronic device which becomes said input machine so as to input data from said default channel and controlling said electronic device such that data is inputted from said unoccupied default channel if said default channel is protected.

8. A communication system as claimed in claim 6, wherein the output machine which can flow data uselessly to said communication control bus includes bus management control means for limiting the number of electronic devices to one.

9. A communication system as claimed in claim 6, wherein the electronic device which becomes an output machine on said communication control bus includes display means for notifying a message indicating that data cannot be outputted if the communication control bus of the specific interval which was requested to be use is in use.

10. A communication system as claimed in claim 6, wherein the electronic device which becomes an input machine on said communication control bus includes display means for notifying a message indicating that data cannot be outputted if the communication control bus of the specific interval which was requested to be use is in use.

11. A communication system as claimed in claim 6, wherein said control means is provided in any one of a plurality of electronic devices connected to said communication control bus.

12. A communication system as claimed in claim 6, wherein said control means is provided in all electronic devices connected to said communication control bus.

* * * * *